US012769683B2

(12) United States Patent
Kulkarni et al.

(10) Patent No.: US 12,769,683 B2
(45) Date of Patent: Oct. 20, 2026

(54) SERIAL PERIPHERAL INTERFACE WITH IN-BAND INTERRUPTS

(71) Applicant: QUALCOMM Incorporated, San Diego, CA (US)

(72) Inventors: Balaji Bhaskar Kulkarni, Bangalore (IN); Manish Rajendra Mehta, Bangalore (IN); Sumeet Kumar Sahu, Berhampur (IN)

(73) Assignee: Qualcomm Incorporated, San Diego, CA (US)

( * ) Notice: Subject to any disclaimer, the term of this patent is extended or adjusted under 35 U.S.C. 154(b) by 51 days.

(21) Appl. No.: 18/905,996

(22) Filed: Oct. 3, 2024

(65) Prior Publication Data

US 2026/0099451 A1 Apr. 9, 2026

(51) Int. Cl.
*G06F 13/42* (2006.01)
*G06F 9/30* (2018.01)
*G06F 13/26* (2006.01)

(52) U.S. Cl.
CPC .......... *G06F 13/26* (2013.01); *G06F 9/30101* (2013.01); *G06F 13/4282* (2013.01)

(58) Field of Classification Search
None
See application file for complete search history.

(56) References Cited

U.S. PATENT DOCUMENTS 10,963,419 B1 * 3/2021 Chin ........................ G06F 13/24
11,030,133 B2 * 6/2021 Graif ........................ G06F 13/24
2008/0235411 A1 * 9/2008 Zhang ................. G06F 13/4291 710/28
2013/0305053 A1 * 11/2013 Laffey ................... H04L 9/3247 713/176
2016/0070666 A1 * 3/2016 Roberston ............. G06F 13/364 710/110
2024/0184735 A1 * 6/2024 Kim .................. H04L 12/40104
2025/0231896 A1 * 7/2025 Shah ...................... G11C 5/066

OTHER PUBLICATIONS

Anonymous: "Serial Peripheral Interface", Wikipedia, The Free Encyclopedia, Aug. 7, 2024, pp. 1-19, XP093208861, p. 12.
Anonymous: "Message Signaled Interrupts—Wikipedia", Wikipedia, The Free Encyclopedia, May 7, 2024, pp. 1-5, XP093326903, p. 1.
International Search Report and Written Opinion PCT/US2025/043204 ISA/EPO Nov. 10, 2025.
Texas Instruments: "TM8320DM646x DMBoC Serial Peripheral Interface (SPI) User's Guide", Mar. 31, 2011, pp. 1-45, XP055089722, p. 19, p. 42, p. 7.

* cited by examiner

*Primary Examiner* — Michael Sun
(74) *Attorney, Agent, or Firm* — Harrity & Harrity, LLP

(57) ABSTRACT

Various aspects of the present disclosure generally relate to integrated circuits. In some aspects, a first device may identify an incoming request. The first device may transmit, to a second device via a serial peripheral interface (SPI) with in-band interrupts (IBIs), an interrupt based at least in part on the incoming request, wherein the interrupt is associated with a channel descriptor, and wherein the channel descriptor is unique per use case and across a plurality of SPI input/output (I/O) channels. Numerous other aspects are described.

27 Claims, 18 Drawing Sheets

300

600

SERIAL PERIPHERAL INTERFACE WITH IN-BAND INTERRUPTS

FIELD OF THE DISCLOSURE

Aspects of the present disclosure generally relate to integrated circuits and, for example, to serial peripheral interfaces (SPIs) with in-band interrupts (IBIs).

BACKGROUND

A system-on-chip (SoC) is an integrated circuit that integrates a plurality of electronic components. The electronic components may include a processor, memory, and/or a transceiver, which may all be integrated on a single piece of silicon. The SoC may contain digital signal processing functions. The SoC may be used for a mobile computing device, such as a smart phone or a tablet computer.

SUMMARY

In some implementations, a first device includes one or more components configured to: identify an incoming request; and transmit, to a second device via a serial peripheral interface (SPI) with in-band interrupts (IBIs), an interrupt based at least in part on the incoming request, wherein the interrupt is associated with a channel descriptor, and wherein the channel descriptor is unique per use case and across a plurality of SPI input/output (I/O) channels.

In some implementations, a first device includes one or more components configured to: receive, from a second device via an SPI with IBIs, an interrupt; identify, based at least in part on an interrupt status register bank, aggregate information for pending interrupts across a plurality of SPI I/O channels, wherein the aggregate information includes priority information associated with the pending interrupts; and process the interrupt based at least in part on the aggregate information.

In some implementations, a first device includes one or more components configured to: receive, from a second device via an SPI with IBIs, an interrupt; and evaluate a priority of the interrupt in accordance with a channel configuration register, wherein the channel configuration register contains one or more use cases associated with each SPI I/O channel of a plurality of SPI I/O channels.

In some implementations, a first device includes one or more components configured to: identify a packet associated with an SPI with IBIs between the first device and a second device; and validate, using an access policy manager, one or more properties associated with the packet to ensure that a secure use case is partitioned from a non-secure use case across a plurality of SPI I/O channels.

In some implementations, a method includes identifying, by a first device, an incoming request; and transmitting, from the first device to a second device via an SPI with IBIs, an interrupt based at least in part on the incoming request, wherein the interrupt is associated with a channel descriptor, and wherein the channel descriptor is unique per use case and across a plurality of SPI I/O channels.

In some implementations, a method includes receiving, by a first device and from a second device via an SPI with IBIs, an interrupt; identifying, by the first device and based at least in part on an interrupt status register bank, aggregate information for pending interrupts across a plurality of SPI I/O channels, wherein the aggregate information includes priority information associated with the pending interrupts; and processing, by the first device, the interrupt based at least in part on the aggregate information.

In some implementations, a method includes receiving, by a first device and from a second device via an SPI with IBIs, an interrupt; and evaluating, by the first device, a priority of the interrupt in accordance with a channel configuration register, wherein the channel configuration register contains one or more use cases associated with each SPI I/O channel of a plurality of SPI I/O channels.

In some implementations, a method includes identifying, by a first device, a packet associated with an SPI with IBIs between the first device and a second device; and validating, by the first device using an access policy manager, one or more properties associated with the packet to ensure that a secure use case is partitioned from a non-secure use case across a plurality of SPI I/O channels.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Figure 1:
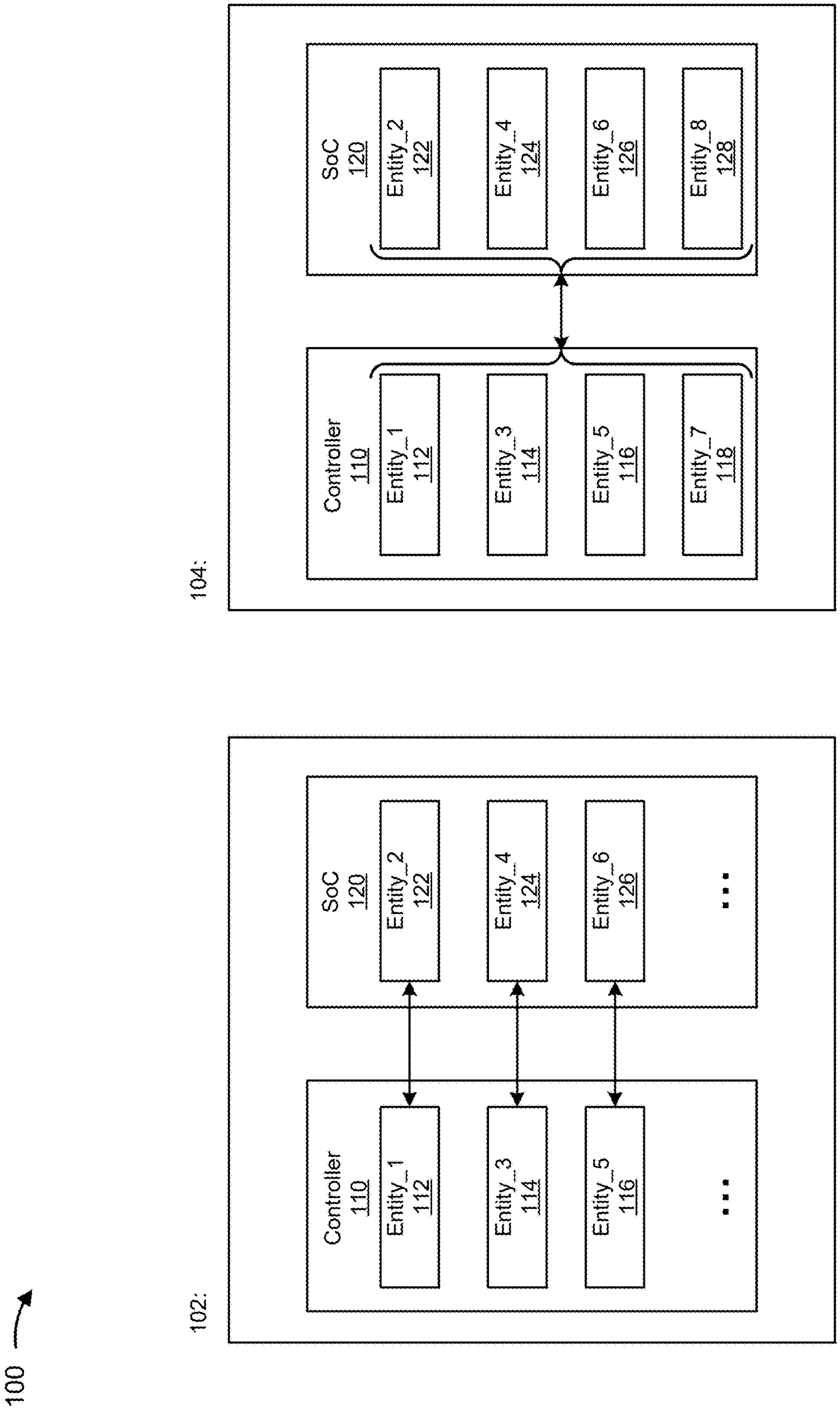
FIG. 1 is a diagram of an example associated with an interface between a controller and a system-on-chip (SoC), in accordance with the present disclosure.

FIG. 1 is a diagram of an example 100 associated with an interface between a controller 110 and a system-on-chip (SoC) 120, in accordance with the present disclosure. In one example, the controller may be a microcontroller or an embedded controller.

As shown by reference number 102, the interface between the controller 110 and the SoC 120 may be associated with a dedicated interface and interrupt path. The controller 110 may include a plurality of entities, which may be associated with a keyboard, a firmware update, a power state, backlight control, telemetry/power limits, and so on. The plurality of entities associated with the controller 110 may include a first entity 112 (Entity_1), a third entity 114 (Entity_3), and a fifth entity 116 (Entity_5). The SoC 120 may include a plurality of entities, which may be associated with a high-level operating system (HLOS), a Unified Extensible Firmware Interface (UEFI), sensors, a trust zone (TZ), power limits, and so on. The plurality of entities associated with the SoC 120 may include a second entity 122 (Entity_2), a fourth entity 124 (Entity_4), and a sixth entity 126 (Entity_6). The plurality of entities of the controller 110 may communicate with the plurality of entities of the SoC 120, albeit in a segmented or fragmented manner. For example, one entity of the controller 110 may communicate with one entity of the SoC 120 via a communication bus. The communication bus may be associated with Inter-Integrated Circuit (I2C) or Improved Inter-Integrated Circuit (I3C). The I3C may be with or without an in-band interrupt (IBI). Multiple I2Cs and/or I3Cs may be used between the controller 110 and the SoC 120.

As shown by reference number 104, the interface between the controller 110 and the SoC 120 may be associated with a serial peripheral interface (SPI) with IBIs. The controller 110 may include a group of entities, which may be associated with a fan control, a power state, a charger state, battery management, sensors, power limits, a display, and so on. The plurality of entities associated with the controller 110 may include a first entity 112 (Entity_1), a third entity 114 (Entity_3), a fifth entity 116 (Entity_5), and a seventh entity 118 (Entity_7). The SoC 120 may include a group of entities, which may be associated with an advanced configuration and power interface (ACPI), battery management, sensors, a TZ, power limits, and so on. The plurality of entities associated with the SoC 120 may include a second entity 122 (Entity_2), a fourth entity 124 (Entity_4), a sixth entity 126 (Entity_6), and an eight entity 128 (Entity_8). The group of entities of the controller 110 may communicate with the group of entities of the SoC 120 using the SPI with IBIs. The SPI may be based at least in part on a synchronous serial communication protocol used for short-distance communication, primarily in embedded systems. The SPI with IBIs may be a consolidated interface. When using the SPI with IBIs, all interrupts may be serviced in a round-robin fashion. The SPI with IBIs may be employed instead of having separate interrupt lines. In one example, the SPI with the IBIs may be a quad serial peripheral interface (QSPI), which may allow for higher data transfer rates by using four data lines instead of one or two data lines. The QSPI may be associated with 4 or 8 pins. In some cases, some entities of the controller 110 and some entities of the SoC 120 may use separate interrupt lines, which may be separate from the group of entities of the controller 110 and the group of entities of the SoC 120 that communicate via the SPI with IBIs.

As indicated above, FIG. 1 is provided as an example. Other examples may differ from what is described with regard to FIG. 1.

An interface between a controller and an SoC that utilizes the SPI with IBIs may suffer from various deficiencies. A first deficiency of the SPI with IBIs may involve missing support for more than one use case over a same SPI input/output (I/O) channel. A second deficiency of the SPI with IBIs may involve missing support for virtual interrupts using the same SPI I/O channel. A third deficiency of the SPI with IBIs may involve missing support for prioritizing interrupts. A fourth deficiency of the SPI with IBIs may involve missing support for defining secure use cases over an SPI I/O channel. Such deficiencies may prevent or inhibit a transfer of data across the interface, which may degrade an overall system performance.

Various aspects relate generally to integrated circuits. Some aspects more specifically relate to an SPI with IBIs. In some aspects, an SPI with IBI interface may be utilized between a controller and an SoC. The SPI with IBI interface may be used by computer original equipment manufacturers (OEMs). The SPI with IBI interface may support defining multiple use cases over a same SPI channel. More than one use case may be associated per SPI channel, which may be evident on SoC software as part of the processing state (both for interrupt and for transfers initiated by the SoC). The SPI with IBI interface may support defining virtual interrupts using the same SPI I/O channel. The SPI with IBI interface may support configuring an interrupt priority for use cases supported across SPI channels. The interrupt priority may be required for one or more SPI channels, which may require the SoC to be aware of the interrupt priority during a processing stage. The SPI with IBI interface may support defining both secure use cases and non-secure use cases over the SPI channels. The secure use cases may be associated with any of the SPI channels, where the secure use cases may require isolation from the non-secure use cases. Such supported features may be enabled by an SoC software/firmware customization.

Particular aspects of the subject matter described in this disclosure can be implemented to realize one or more of the following potential advantages. In some examples, by enhancing an SPI with IBIs between an SoC and a controller, the described techniques can be used to improve data transfer between the SoC and/or the controller. The improved data transfer may be due to an SoC software/firmware customization that enables support for defining multiple use cases over a same SPI I/O channel, defining virtual interrupts using the same SPI I/O channel, configuring interrupt priority for use cases supported across SPI I/O channels, and/or defining both secure use cases and non-secure use cases over the SPI I/O channels. Such enhancements may improve communications between the SoC and the controller, thereby improving an overall system performance.

Figure 2:
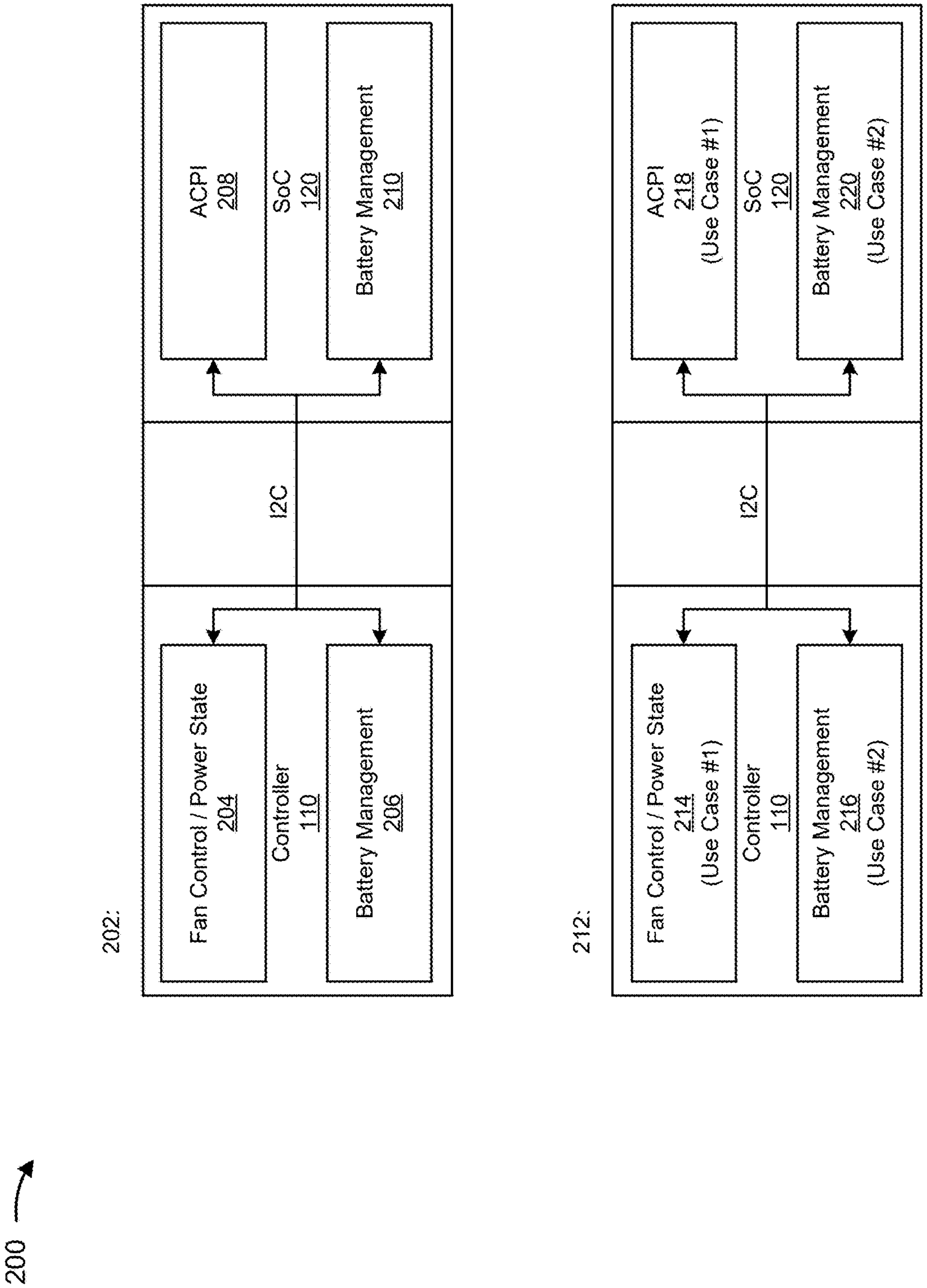
FIG. 2 is a diagram of an example associated with a lack of support for multiple use cases over a same serial peripheral interface (SPI) input/output (I/O) channel, in accordance with the present disclosure.

FIG. 2 is a diagram of an example 200 associated with a lack of support for multiple use cases over a same SPI I/O channel, in accordance with the present disclosure.

As shown by reference number 202, when an interface between a controller 110 and an SoC 120 is associated with a dedicated interface and interrupt path, a shared I2C may be provided for ACPI and battery management using a unique 7-bit address. The ACPI and the battery management may be shared on a same I2C bus. The controller 110 may be associated with a fan control or power state 204. The controller 110 may be associated with battery management 206. The SoC 120 may be associated with ACPI 208. The SoC 120 may be associated with battery management 210.

As shown by reference number 212, when the interface between the controller 110 and the SoC 120 is associated with an SPI with IBIs (e.g., QSPI with IBIs), the SPI with IBIs may not provide support for multiple use cases on a same SPI I/O channel. For example, a first use case may be associated with a fan control or power state, and a second use case may be associated with battery management. The controller 110 may be associated with a fan control or power state 204. The controller 110 may be associated with battery management 206. The SoC 120 may be associated with ACPI 208. The SoC 120 may be associated with battery management 210. The SPI with IBIs may assume one use case per SPI I/O channel, which may not always be true as more than one use case may be shared over the same SPI I/O channel. In order to share the multiple use cases on the same SPI I/O channel using the SPI with IBIs, both the controller 110 and the SoC 120 may need a mechanism to differentiate receive (Rx) and transmit (Tx) packets to identify a use case owner.

As an example, when ACPI and battery management use cases are shared on the same SPI I/O channel, the SoC 120 may detect an incoming interrupt on an "I/O-1" line and a hardware interrupt status register (ISR) may be invoked for further processing. However, the SoC 120 may not be aware if the interrupt raised is due to the ACPI use case or the battery management use case on the controller 110, which may be required to notify a corresponding software entity on the SoC 120. Thus, a mechanism may be needed on top of an SPI with IBI hardware interface to determine a cause of the interrupt for channels in which more than one use case is defined on the controller 110.

As indicated above, FIG. 2 is provided as an example. Other examples may differ from what is described with regard to FIG. 2.

In some aspects, in order to support multiple use cases on a same SPI I/O channel, a channel descriptor may be defined, where the channel descriptor may be unique per use case and across all SPI I/O channels. The SoC may use the channel descriptor for each packet sent out on a QSPI bus. The controller may parse the channel descriptor and route the packet to a corresponding entity of a firmware.

Figure 3:
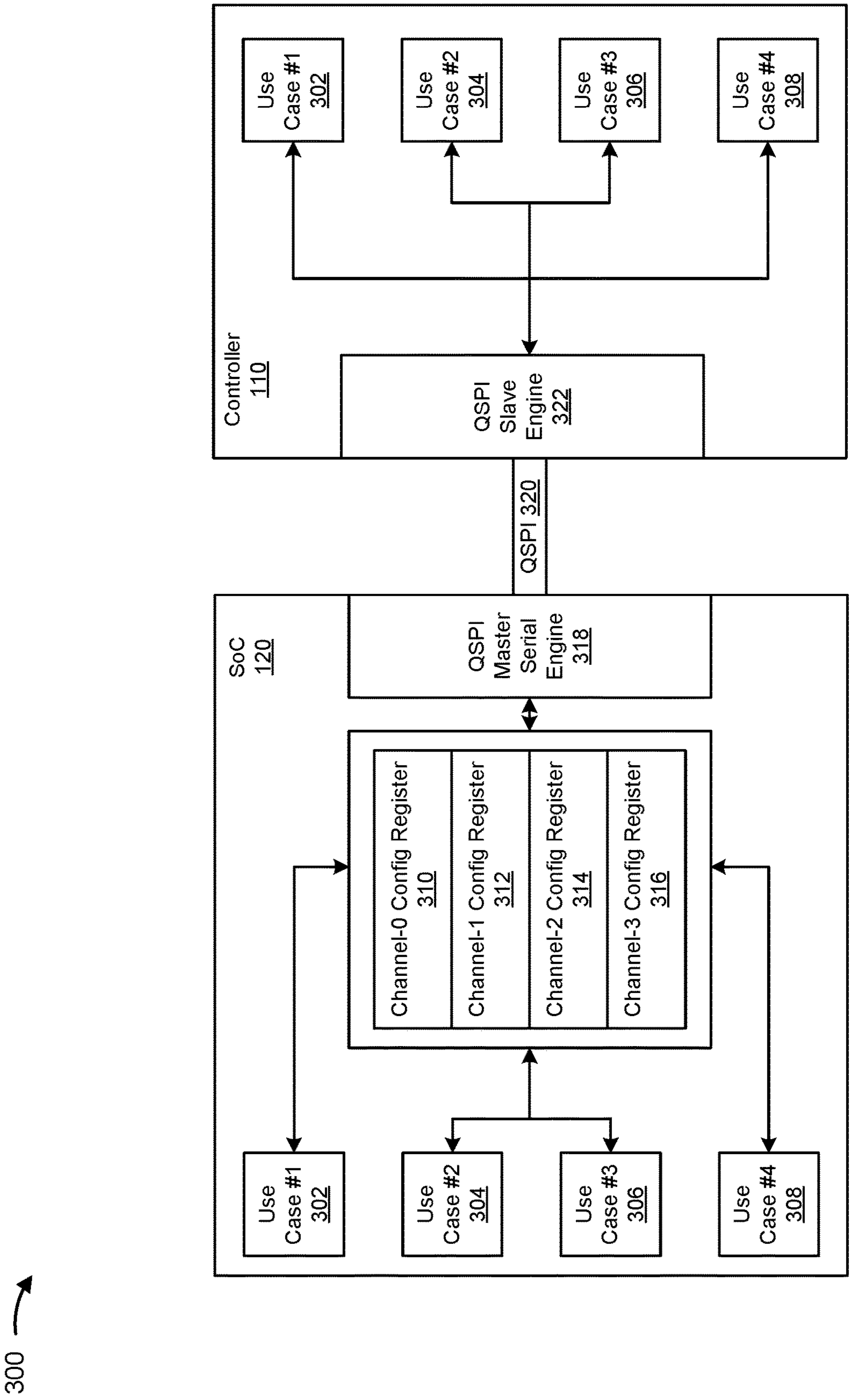
FIG. 3 is a diagram of an example associated with supporting multiple use cases over a same SPI I/O channel, in accordance with the present disclosure.

FIG. 3 is a diagram of an example 300 associated with supporting multiple use cases over a same SPI I/O channel, in accordance with the present disclosure.

As shown in FIG. 3, an SoC 120 may be associated with multiple use cases, such as a first use case 302, a second use case 304, a third use case 306, and a fourth use case 308. The multiple use cases may be associated with multiple channel configuration registers. The multiple channel configuration registers may include a first channel configuration register 310, a second channel configuration register 312, a third channel configuration register 314, and a fourth channel configuration register 316. The SoC 120 may include a QSPI master serial engine 318, which may communicate with a QSPI slave engine 322 associated with a controller 110. The SoC 120 may communicate with the controller 110 via a QSPI with IBI 320. The controller 110 may also be associated with the multiple use cases, such as the first use case 302, the second use case 304, the third use case 306, and the fourth use case 308.

As indicated above, FIG. 3 is provided as an example. Other examples may differ from what is described with regard to FIG. 3.

Figure 4:
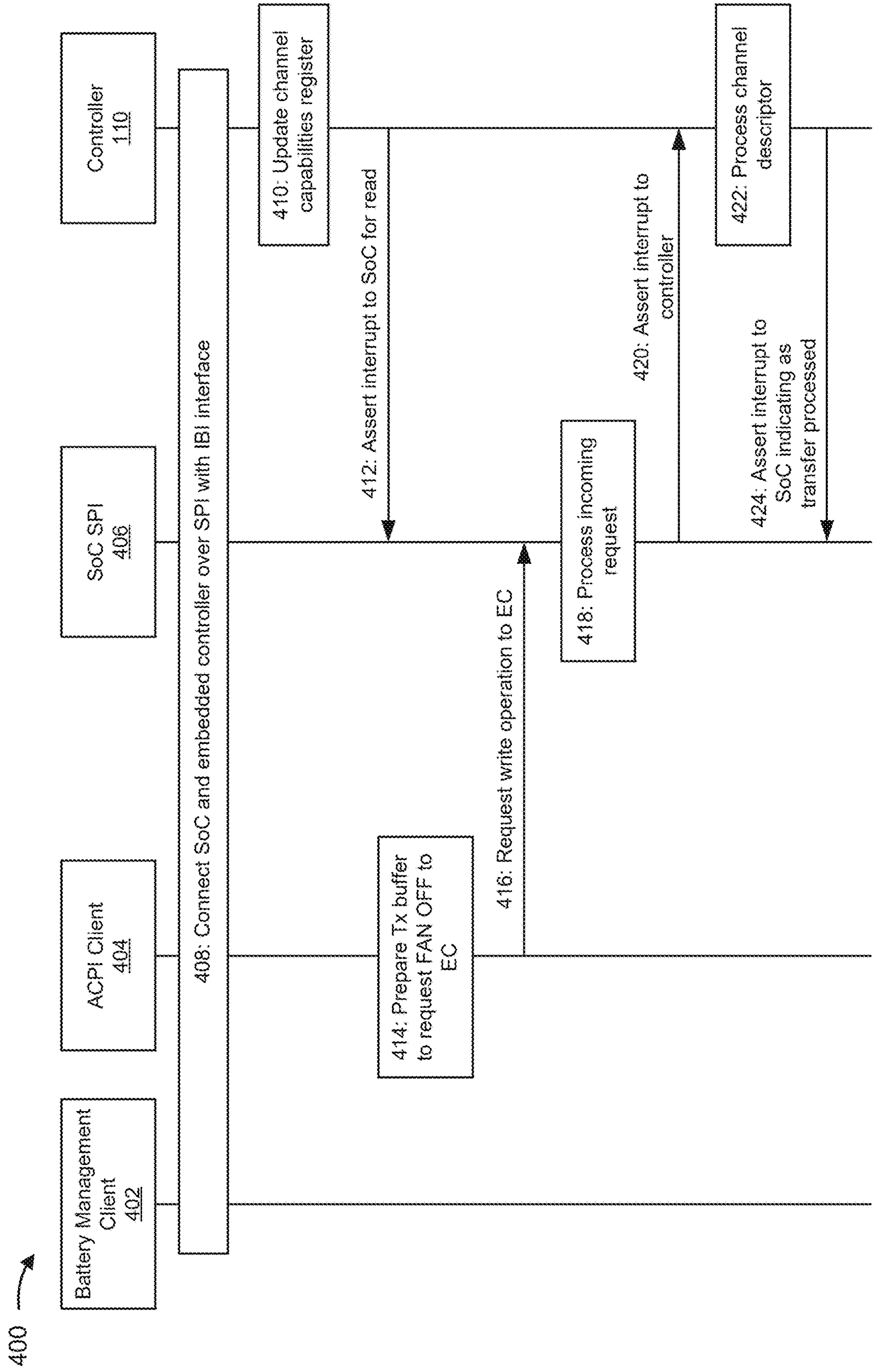
FIG. 4 is a diagram of an example associated with supporting multiple use cases over a same SPI I/O channel, in accordance with the present disclosure.

FIG. 4 is a diagram of an example 400 associated with supporting multiple use cases over a same SPI I/O channel, in accordance with the present disclosure. The example 400 includes a battery management client 402, an ACPI client 404, an SoC SPI 406, and a controller 110. The battery management client 402, the ACPI client 404, and the SoC SPI 406 may be associated with an SoC (e.g., SoC 120).

In some aspects, multiple use cases may be supported over a same SPI I/O channel using channel descriptors based at least in part on an SoC to controller write operation. As shown by reference number 408, the SoC and the controller 110 may be connected over an SPI with IBI interface. The SoC and the controller 110 may be powered up, and a QSPI engine/driver may be initialized at a software layer. The SoC and/or the controller 110 may have multiple use cases supported on the same SPI I/O channel (e.g., ACPI and battery management). As shown by reference number 410, the controller 110 may update a channel capabilities register, which may indicate an SPI I/O channel support for ACPI and battery management use cases. As shown by reference number 412, the controller 110 may assert an interrupt to the SoC SPI 406 for read.

As shown by reference number 414, the ACPI client 404 may prepare a Tx buffer to request a fan off to the controller 110 (managed over ACPI). As shown by reference number 416, the ACPI client 404 may request a write operation to the controller 110. As shown by reference number 418, the SoC SPI 406 may detect the incoming request from the ACPI client 404. The SoC SPI 406 may check a channel configuration register and determine that there are multiple use cases supported on the SPI I/O channel by the controller 110. The SoC SPI 406 may check a status of the Tx buffer by reading a channel status register. The SoC SPI 406 may update a channel descriptor to indicate that an outgoing buffer is associated with the ACPI use case.

As shown by reference number 420, the SoC SPI 406 may assert the interrupt to the controller 110. As shown by reference number 422, a controller hardware/firmware may process an incoming buffer. The controller hardware/firmware may parse the channel descriptor to determine which is a target use case on the SPI I/O channel (e.g., ACPI). The controller firmware may invoke a corresponding client callback for further processing. As shown by reference number 424, the controller 110 may assert the interrupt to the SoC SPI 406, where the controller 110 may indicate that a transfer has been processed.

As indicated above, FIG. 4 is provided as an example. Other examples may differ from what is described with regard to FIG. 4.

Figure 5:
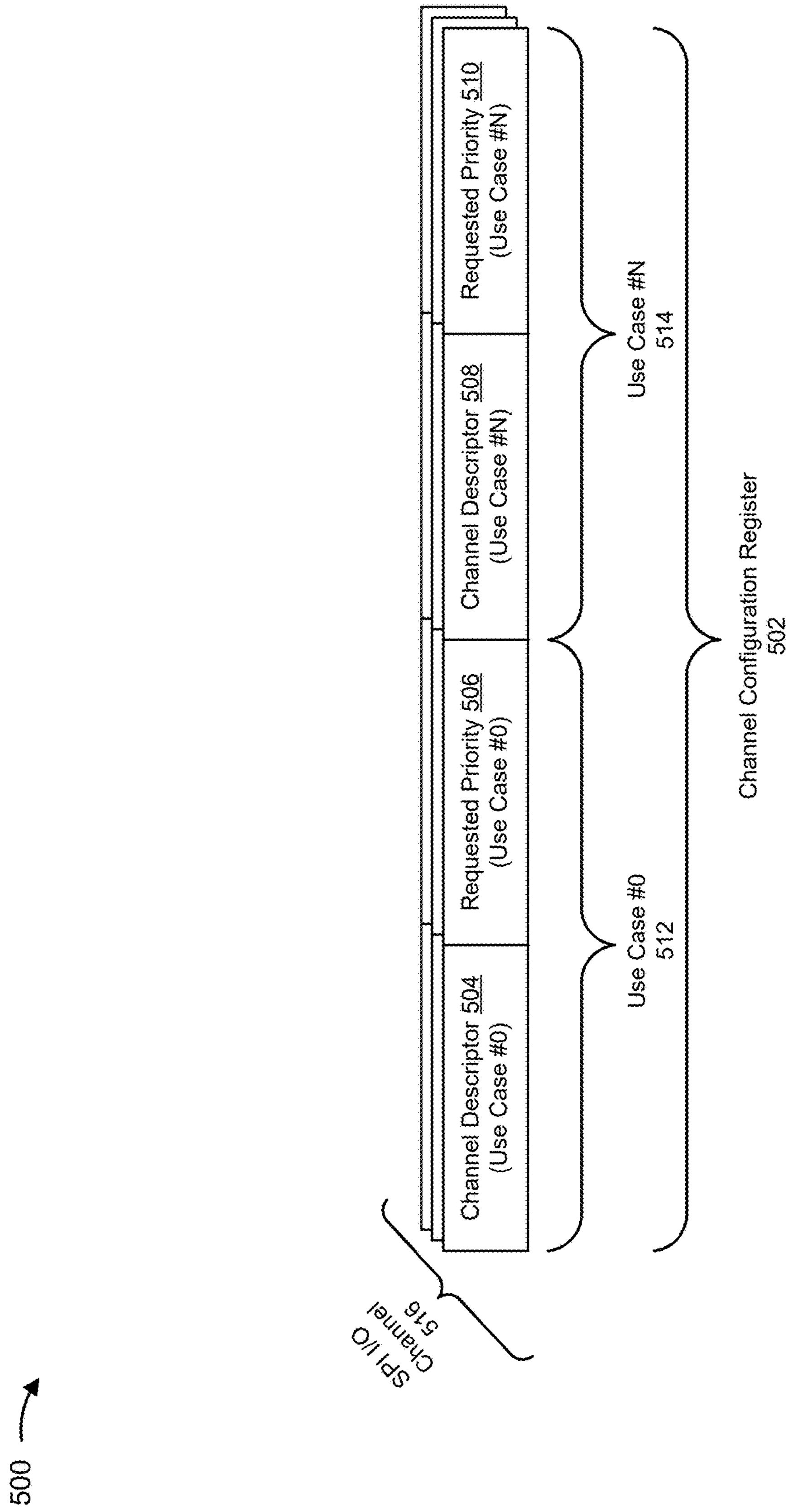
FIG. 5 is a diagram of an example associated with supporting multiple use cases over a same SPI I/O channel, in accordance with the present disclosure.

FIG. 5 is a diagram of an example 500 associated with supporting multiple use cases over a same SPI I/O channel, in accordance with the present disclosure.

As shown in FIG. 5, a channel configuration register 502 may be defined. One channel configuration register may be defined per channel. Different channel configuration registers may be defined for different channels. The channel configuration register 502 may be associated with a first use case 512 (Use Case #0). The first use case 512 may be associated with a channel descriptor 504 and a requested priority 506. The channel descriptor 504 may be unique per each use case across SPI I/O channels 516. The requested priority 506 may be configurable per use case. The channel configuration register 502 may be associated with an Nth use case 514 (Use Case #N), where N is an integer. The Nth use case 514 may be associated with a channel descriptor 508 and a requested priority 510. The channel descriptor 508 may be unique per each use case across the SPI I/O channels 516. The requested priority 510 may be configurable per use case.

As indicated above, FIG. 5 is provided as an example. Other examples may differ from what is described with regard to FIG. 5.

Figure 6:
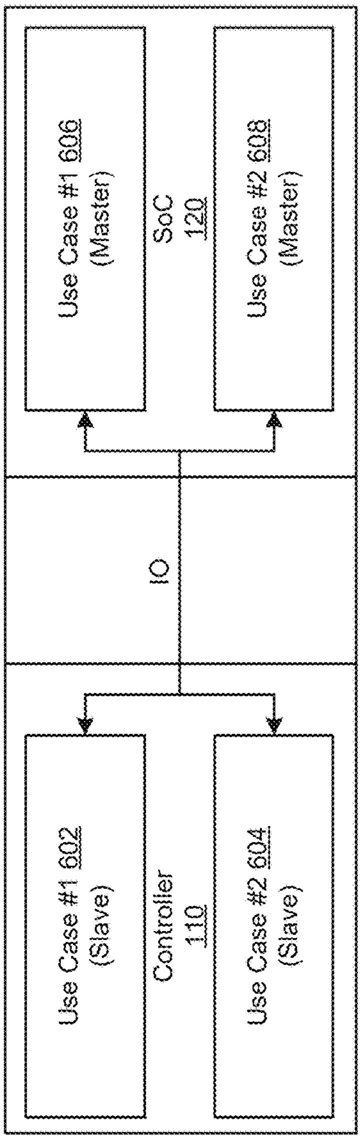
FIG. 6 is a diagram of an example associated with a lack of support for virtual interrupts using a same SPI I/O channel, in accordance with the present disclosure.

FIG. 6 is a diagram of an example 600 associated with a lack of support for virtual interrupts using a same SPI I/O channel, in accordance with the present disclosure.

As shown in FIG. 6, when an interface between a controller 110 and an SoC 120 is associated with an SPI with IBIs (e.g., QSPI with IBIs), the SPI with IBIs may not provide support for virtual interrupts using a same SPI I/O channel. The controller 110 may be associated with a first use case 602 and a second use case 604. The SoC 120 may be associated with the first use case 606 and the second use case 608. The SPI with IBIs may assume one use case per SPI I/O channel, which may not always be true as more than one use case may be shared over the same SPI I/O channel, and each use case may require interrupt support. When OEMs and/or original design manufacturers (ODMs) design based at least in part on the SPI with IBIs where each channel may have multiple use cases, a mechanism may be needed to differentiate a source of interrupt to the SoC 120. The SoC 120 may need the mechanism to differentiate incoming packets and identify the use case associated with an IBI line on the controller 110.

As indicated above, FIG. 6 is provided as an example. Other examples may differ from what is described with regard to FIG. 6.

In some aspects, in order to support virtual interrupts using a same SPI I/O channel, when an SoC has discovered a use case supported with an I/O SPI channel using a configuration register, an interrupt status register bank may be defined at an interface level (e.g., read/write for the SoC and read-only for a controller). The interrupt status register bank may reflect aggregated pending interrupt information across a plurality of channels (e.g., 4 channels) and use cases. After detecting an interrupt, the SoC may read the interrupt status register bank to determine aggregated information for pending interrupts and priorities.

Figure 7:
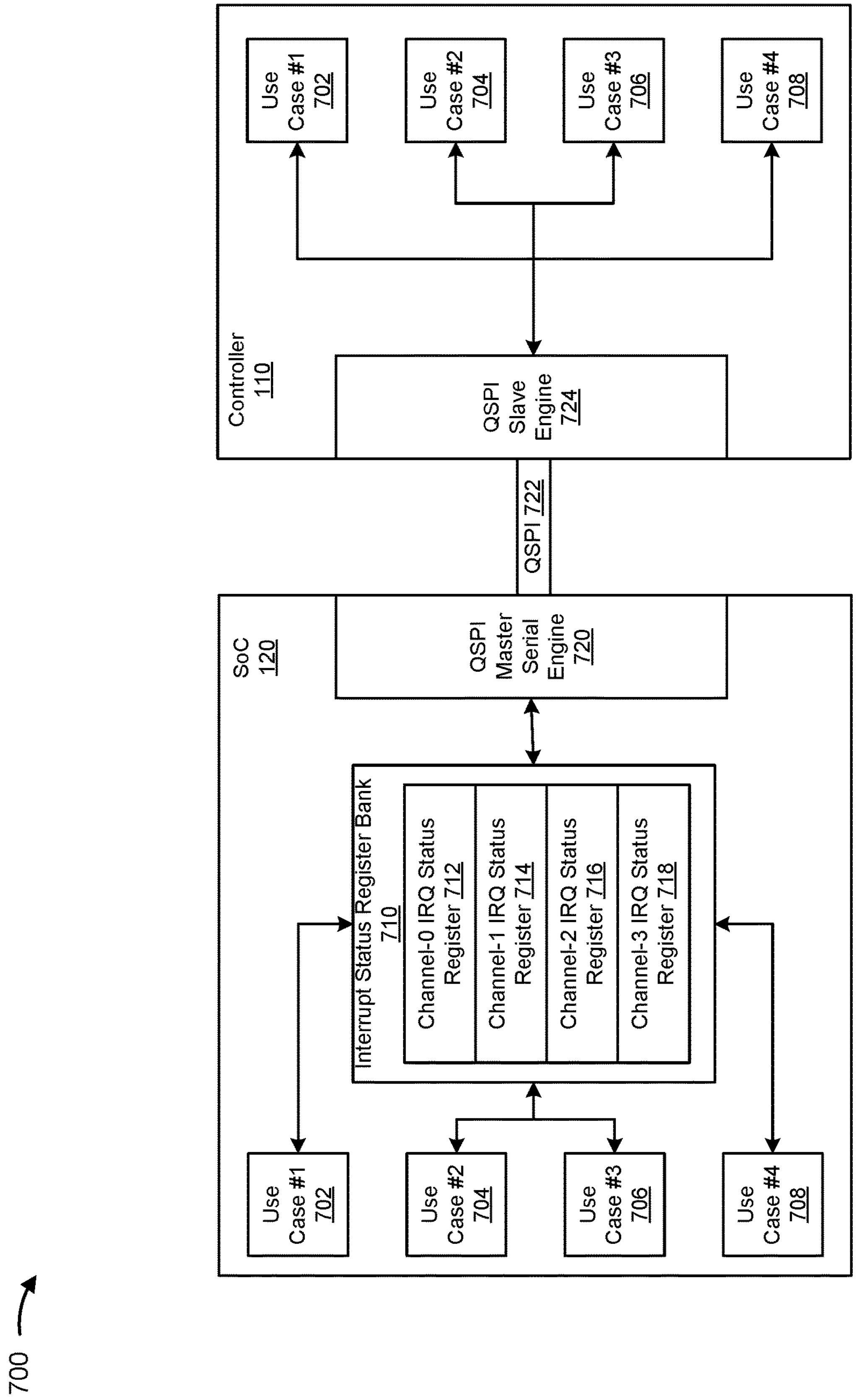
FIG. 7 is a diagram of an example associated with supporting virtual interrupts using a same SPI I/O channel, in accordance with the present disclosure.

FIG. 7 is a diagram of an example 700 associated with supporting virtual interrupts using a same SPI I/O channel, in accordance with the present disclosure.

As shown in FIG. 7, an SoC 120 may be associated with multiple use cases, such as a first use case 702, a second use case 704, a third use case 706, and a fourth use case 708. The multiple use cases may be associated with an interface status register bank 710. The interface status register bank 710 may include a plurality of channel interrupt request (IRQ) status registers, such as a first channel IRQ status register 712, a second channel IRQ status register 714, a third channel IRQ status register 716, and a fourth channel IRQ status register 718. The SoC 120 may include a QSPI master serial engine 720, which may communicate with a QSPI slave engine 724 associated with a controller 110. The SoC 120 may communicate with the controller 110 via a QSPI with IBI 722. The controller 110 may also be associated with the multiple use cases, such as the first use case 702, the second use case 704, the third use case 706, and the fourth use case 708.

As indicated above, FIG. 7 is provided as an example. Other examples may differ from what is described with regard to FIG. 7.

Figure 8:
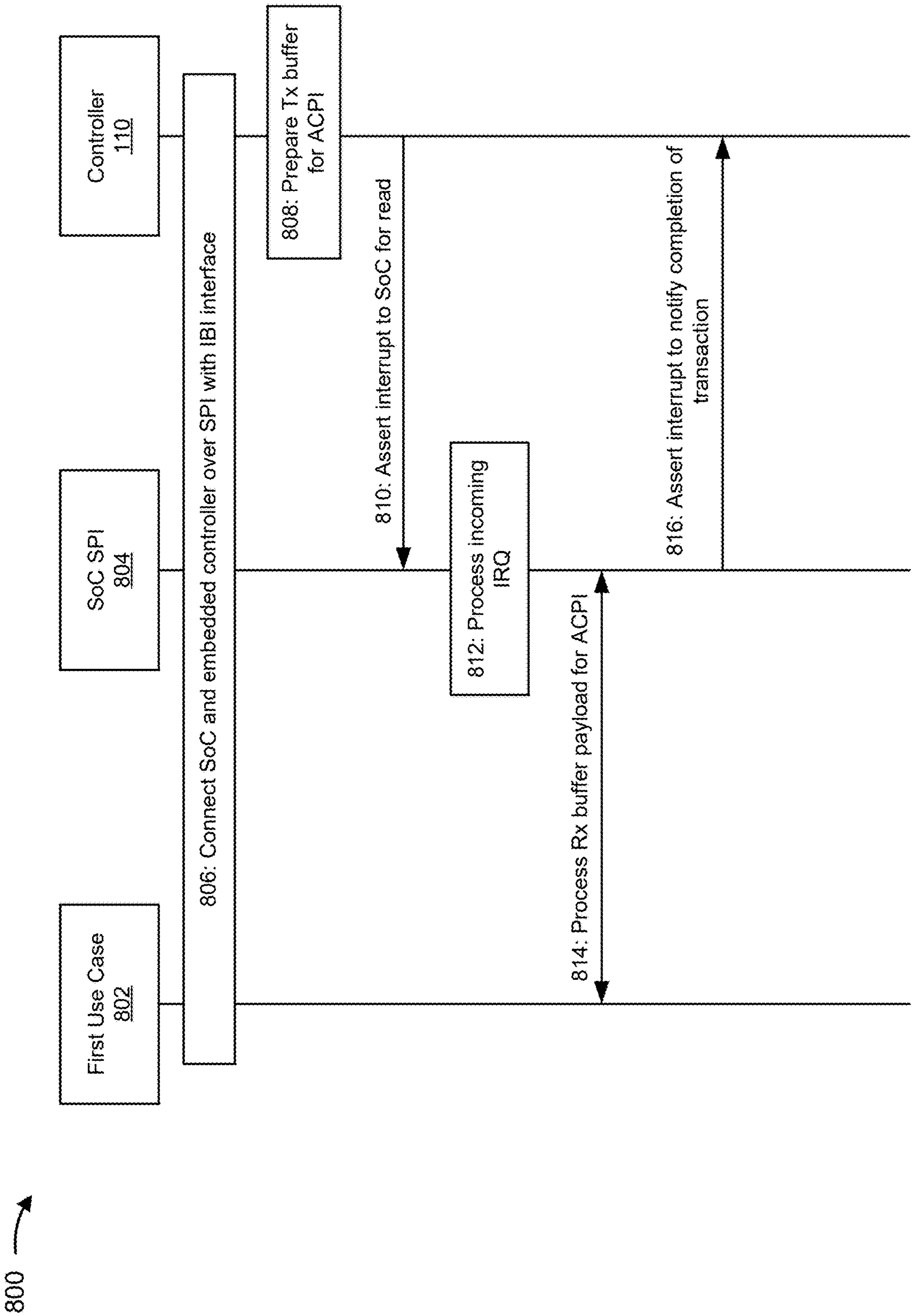
FIG. 8 is a diagram of an example associated with supporting virtual interrupts using a same SPI I/O channel, in accordance with the present disclosure.

FIG. 8 is a diagram of an example 800 associated with supporting virtual interrupts using a same SPI I/O channel, in accordance with the present disclosure. The example 800 includes a first use case 802, an SoC SPI 804, and a controller 110. The first use case 802 and the SoC SPI 804 may be associated with an SoC (e.g., SoC 120).

In some aspects, virtual interrupts may be supported using a same SPI I/O channel. As shown by reference number 806, the SoC (e.g., the first use case 802 and the SoC SPI 804) and the controller 110 may be connected over an SPI with IBI interface. The controller 110 may have multiple use cases for SPI channel 0 (e.g., the first use case and a second use case). The controller 110 may have a single use case for SPI channels 1-3. As shown by reference number 808, the controller 110 may prepare a Tx buffer for an ACPI associated with the SPI channel 0. As shown by reference number 810, the controller 110 may assert an interrupt to the SoC SPI 804 for read.

As shown by reference number 812, the SoC SPI 804 may process the incoming IRQ. The SoC SPI 804 may determine a channel descriptor and priority of the IRQ. The SoC SPI 804 may update a channel 0 IRQ status register. The SoC SPI 804 may evaluate pending interrupts across all channels and use cases per channel. The SoC SPI 804 may process an interrupt with a highest priority. As shown by reference number 814, the first use case 802 and/or the SoC SPI 804 may process an Rx buffer payload for ACPI. As shown by reference number 816, the SoC SPI 804 may assert the interrupt to notify the controller 110 of a completed transaction.

As indicated above, FIG. 8 is provided as an example. Other examples may differ from what is described with regard to FIG. 8.

Figure 9:
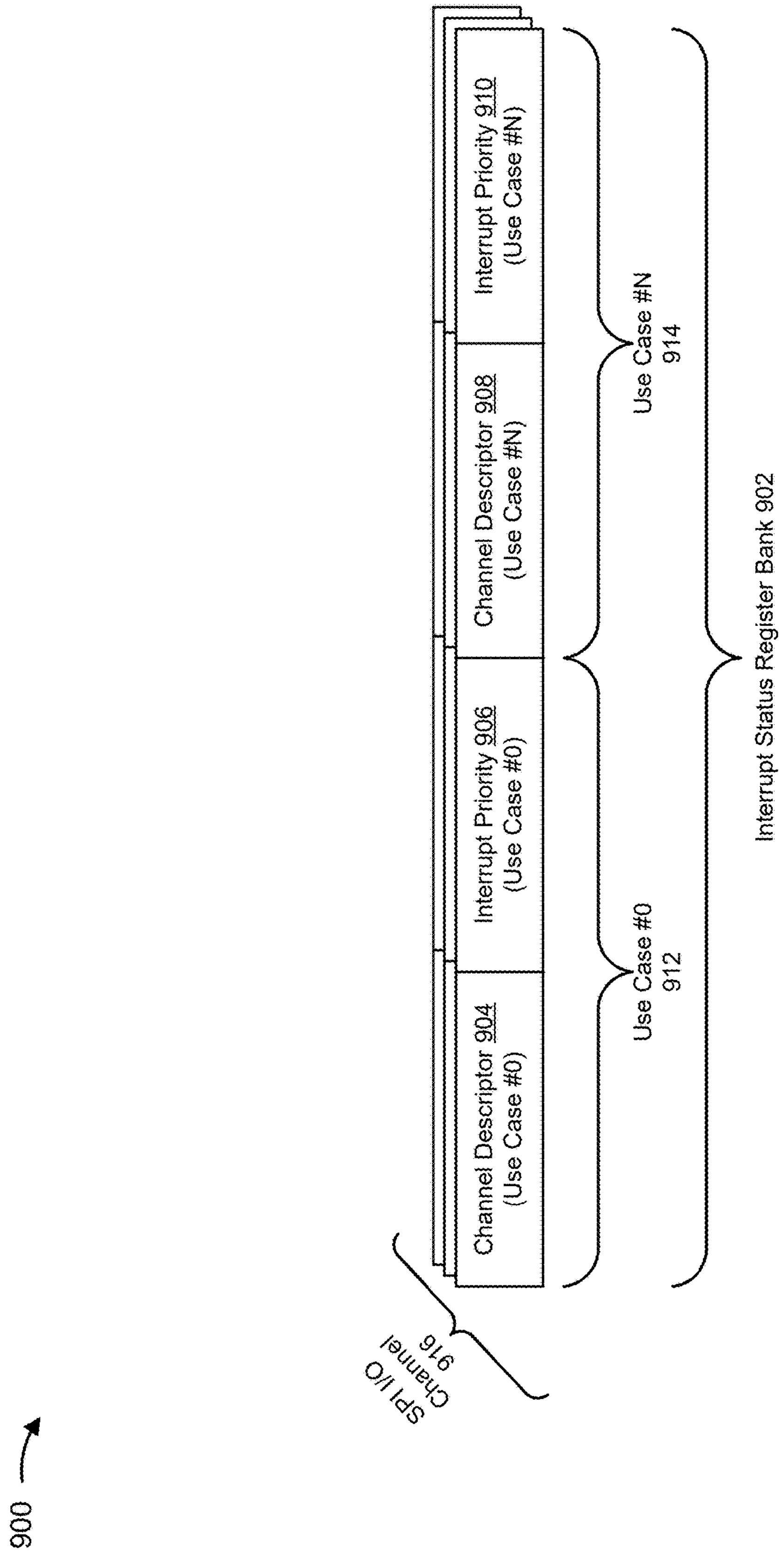
FIG. 9 is a diagram of an example associated with supporting virtual interrupts using a same SPI I/O channel, in accordance with the present disclosure.

FIG. 9 is a diagram of an example 900 associated with supporting virtual interrupts using a same SPI I/O channel, in accordance with the present disclosure.

As shown in FIG. 9, an interrupt status register bank 902 may be defined. The interrupt status register bank 902 may be defined across all SPI I/O channels 916 and use cases. The interrupt status register bank 902 may be associated with a first use case 912 (Use Case #0). The first use case 912 may be associated with a channel descriptor 904 and an interrupt priority 906. The channel descriptor 904 may be unique per each use case across the SPI I/O channels 916. The interrupt priority 906 may be associated with the first use case 912. The interrupt status register bank 902 may be associated with an Nth use case 914 (Use Case #N), where N is an integer. The Nth use case 914 may be associated with a channel descriptor 908 and an interrupt priority 910. The channel descriptor 908 may be unique per each use case across the SPI I/O channels 916. The interrupt priority 910 may be associated with the Nth use case 914.

As indicated above, FIG. 9 is provided as an example. Other examples may differ from what is described with regard to FIG. 9.

When an interface between a controller and an SoC is associated with an SPI with IBIs (e.g., QSPI with IBIs), the SPI with IBIs may not provide support for prioritizing interrupts. In an SPI with IBI interface, each I/O line may be assigned to one channel and may act as an interrupt line. When multiple use cases are associated with concurrent asserted interrupts, the interrupts may be serviced in a round-robin manner without any provision for configuring an interrupt priority and servicing for latency critical use cases that are defined by OEMs.

As an example, an ACPI service on the controller may assert an IRQ for a fan status change, which may be associated with a low priority. A root of trust (RoT) security service on the controller may assert an IRQ for a critical event to be sent out to a TZ on the SoC, which may be associated with a higher priority. In an absence of interrupt priority support, a QSPI engine on the controller may process interrupts in the round-robin manner, such that the QSPI engine may service a low-priority request (e.g., ACPI interrupt for fan) over a high-priority request (e.g., RoT security interrupt for TZ). Depending on the use case or payload associated with a low-priority interrupt, a high-priority interrupt may not be handled, which may potentially impact a system and/or user.

In some aspects, in order to support prioritizing interrupts, an interrupt priority may be configured across a plurality of channels (e.g., 4 SPI I/O channels), which may be evaluated during a processing of an interrupt by an SoC. An interrupt priority configuration register bank may be defined, where the interrupt priority configuration register bank may be associated with an SPI with IBI interface (e.g., read/write for the SoC and read-only for a controller). The SoC may read a channel configuration register for priorities associated per use case. The SoC may evaluate a requested priority per use case, and the SoC may support customizing the priority per use case (e.g., using an ACPI or a device tree) by OEMs. The SoC may update the interrupt priority configuration register bank for each use case across all of the channels.

Figure 10:
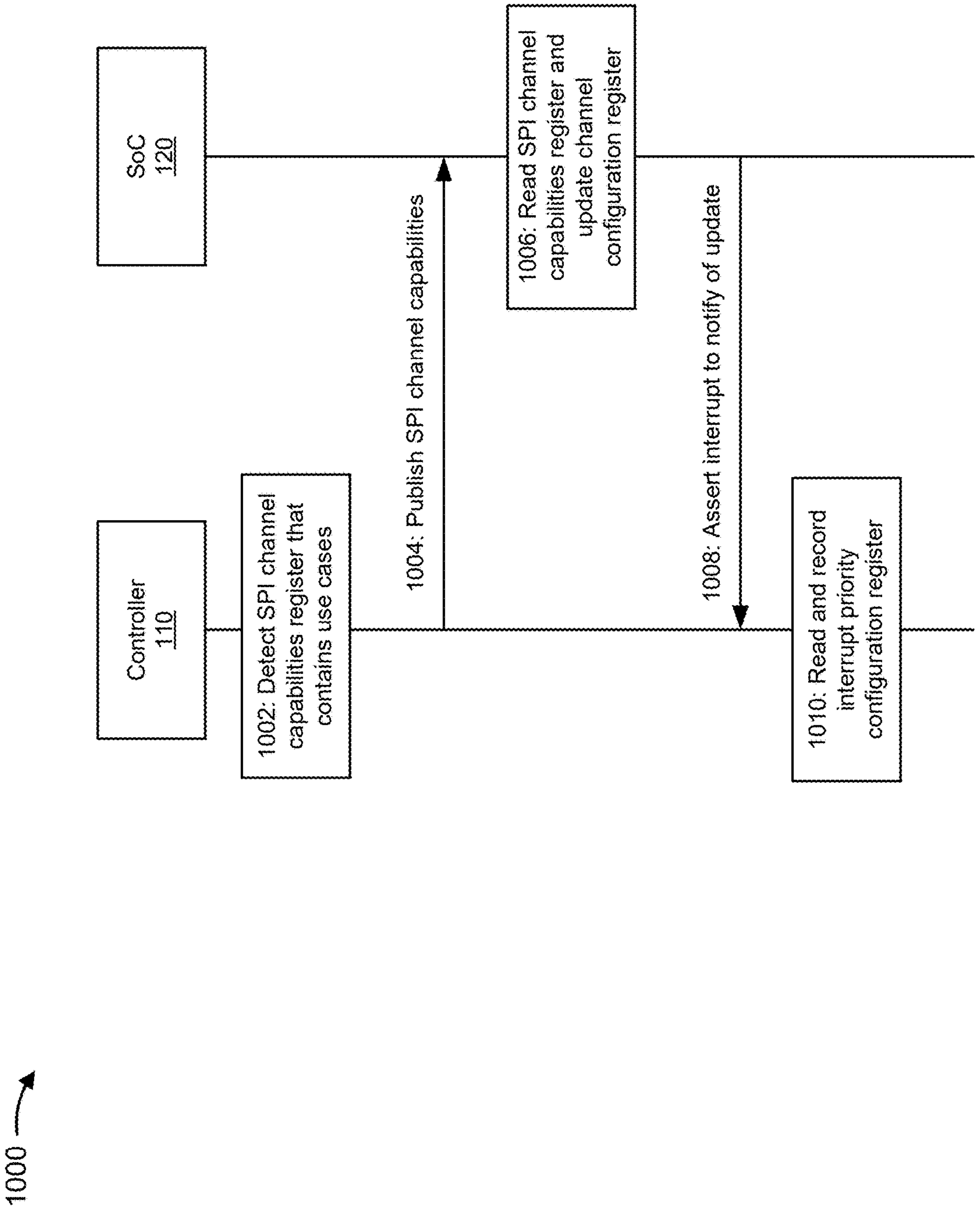
FIG. 10 is a diagram of an example associated with supporting a prioritization of interrupts, in accordance with the present disclosure.

FIG. 10 is a diagram of an example 1000 associated with supporting a prioritization of interrupts, in accordance with the present disclosure. The example 1000 includes a controller 110 and an SoC 120.

In some aspects, an SPI channel interrupt priority configuration and processing sequence may be defined. As shown by reference number 1002, the controller 110 may determine that an SPI channel capabilities register (channel capabilities register) contains use cases associated with each SPI I/O channel. The SPI channel capabilities register may contain information for configuring the priority per use case. As shown by reference number 1004, the controller 110 may publish SPI channel capabilities via an SPI channel capabilities register. As shown by reference number 1006, the SoC 120 may read the SPI channel capabilities register published by the controller 110. The SoC 120 may determine a requested priority per use case from the controller 110. The SoC 120 may evaluate an interrupt priority (configurable by OEMs on the SoC 120 via an ACPI or device tree). The SoC 120 may update an interrupt priority configuration register (channel configuration register) across all use cases supported on SPI I/O channels (read/write for the SoC 120 and read-only for the controller 110). As shown by reference number 1008, the SoC 120 may assert an interrupt to notify an update of the interrupt priority configuration register. As shown by reference number 1010, the controller 110 (e.g., controller firmware) may read and record the interrupt priority configuration register. In some aspects, the channel configuration register may always be published or written by the SoC 120. The channel capabilities may always be published or written by the controller 110.

As indicated above, FIG. 10 is provided as an example. Other examples may differ from what is described with regard to FIG. 10.

Figure 11:
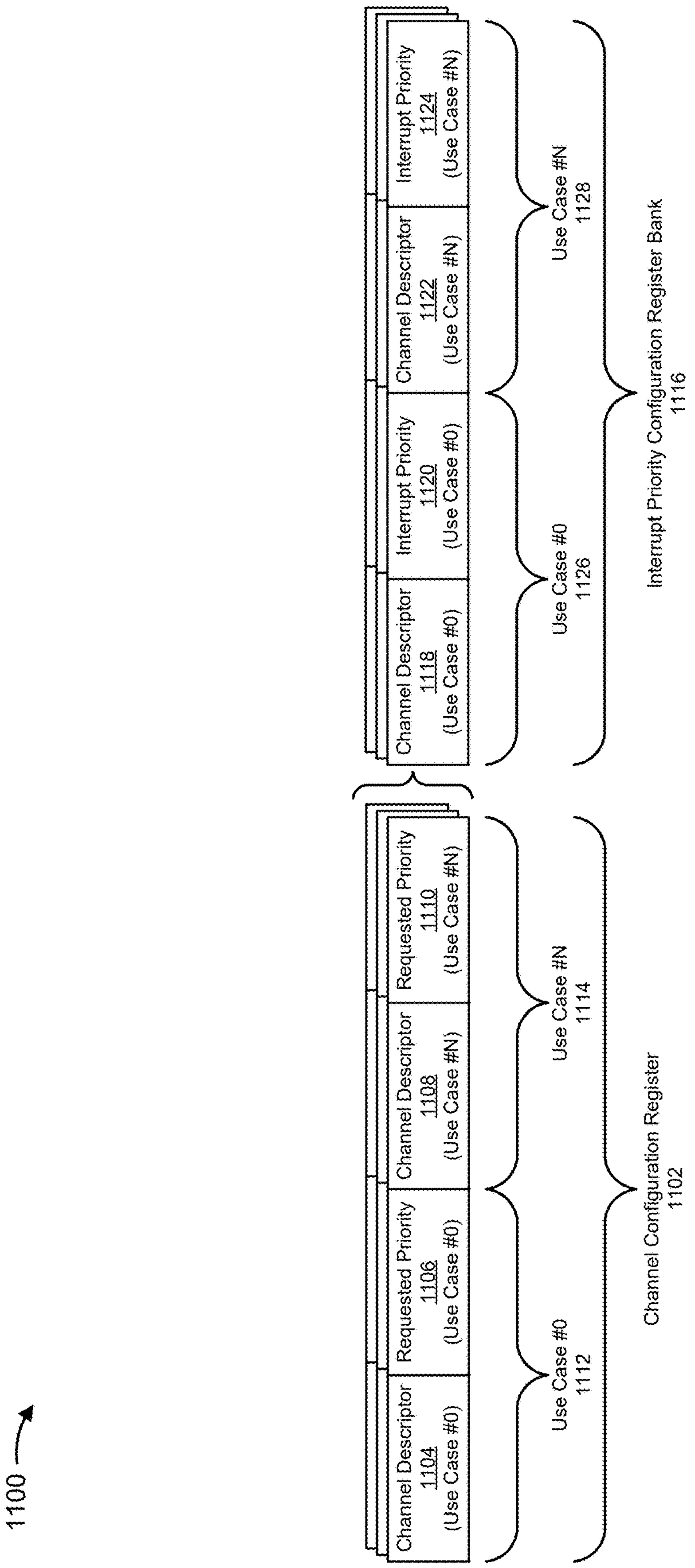
FIG. 11 is a diagram of an example associated with supporting a prioritization of interrupts, in accordance with the present disclosure.

FIG. 11 is a diagram of an example 1100 associated with supporting a prioritization of interrupts, in accordance with the present disclosure.

As shown in FIG. 11, a channel configuration register 1102 may be defined. One channel configuration register may be defined per channel. Different channel configuration registers may be defined for different channels. The channel configuration register 1102 may be associated with a first use case 1112 (Use Case #0). The first use case 1112 may be associated with a channel descriptor 1104 and a requested priority 1106. The channel descriptor 1104 may be unique per each use case across SPI I/O channels. The requested priority 1106 may be configurable per use case. The channel configuration register 1102 may be associated with an Nth use case 1114 (Use Case #N), where N is an integer. The Nth use case 1114 may be associated with a channel descriptor 1108 and a requested priority 1110. The channel descriptor 1108 may be unique per each use case across the SPI I/O channels. The requested priority 1110 may be configurable per use case.

As further shown in FIG. 11, an interrupt priority configuration register bank 1116 may be defined (e.g., read/write for an SoC and read-only for a controller). The interrupt priority configuration register bank 1116 may be associated with a first use case 1126 (Use Case #0). The first use case 1126 may be associated with a channel descriptor 1118 and an interrupt priority 1120. The channel descriptor 1118 may be unique per each use case across SPI I/O channels. The interrupt priority 1120 may be associated with the first use case 1126. The interrupt priority configuration register bank 1116 may be associated with an Nth use case

1128 (Use Case #N), where N is an integer. The Nth use case 1128 may be associated with a channel descriptor 1122 and an interrupt priority 1124. The channel descriptor 1122 may be unique per each use case across the SPI I/O channels. The interrupt priority 1124 may be associated with the Nth use case 1128.

As indicated above, FIG. 11 is provided as an example. Other examples may differ from what is described with regard to FIG. 11.

When an interface between a controller and an SoC is associated with a dedicated interface and interrupt path, a secure TZ IC3 interface may be provided. Secure transactions between the controller and the SoC may be supported through a dedicated I3C. When the interface between the controller and the SoC is associated with an SPI with IBIs (e.g., QSPI with IBIs), the SPI with IBIs may lack support for secure use cases. The SPI with IBIs may not provide support for defining secure use cases over an SPI I/O channel. The SPI with IBIs may not support a partitioning of secure versus non-secure use cases at a protocol level, which may be required given that secure use cases (e.g., RoT or TZ) may be merged with other, non-secure use cases (e.g., ACPI). For example, for a TZ interrupt from the controller, a direct and secure controller communication with a TZ may be requested.

In some aspects, in order to support secure and non-secure use cases over an SPI with IBIs, an access policy manager may be defined on an SoC. The access policy manager may manage secure and non-secure transactions using a channel descriptor, a security attribute, and/or an address. The channel descriptor may uniquely identify a type of use case across an SPI I/O channel. The security attribute may be secure or non-secure. The address may be part of a range of addresses that are allowed to be accessed by a given use case, in both an Rx and Tx direction.

In some aspects, for each Tx/Rx packet traveling through an SPI with IBIs, the access policy manager may validate the channel descriptor, the security attribute, and/or the address to ensure that a secure use case is partitioned from non-secure use cases across SPI I/O channels. SoC access policy manager configuration registers for read/write may be limited to software running in a secure mode to avoid non-secure software from tampering with a channel configuration. In some cases, a similar access policy manager may be implemented in controller firmware.

Figure 12:
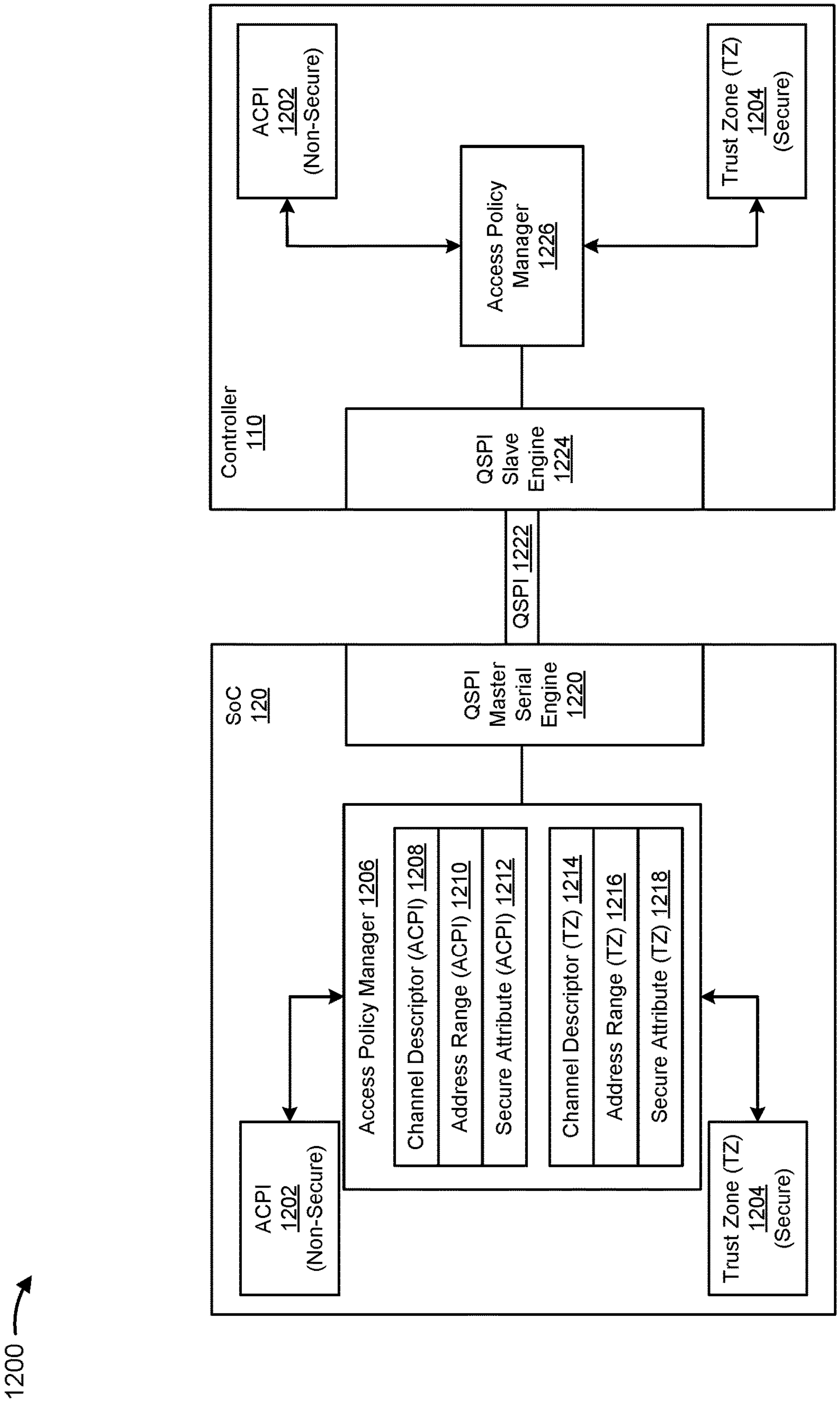
FIG. 12 is a diagram of an example associated with supporting secure and non-secure use cases over an SPI with in-band interrupts (IBIs), in accordance with the present disclosure.

FIG. 12 is a diagram of an example 1200 associated with supporting secure and non-secure use cases over an SPI with IBIs, in accordance with the present disclosure.

As shown in FIG. 12, an SoC 120 may include a first channel (Channel 0) and a second channel (Channel 1). The first channel may be associated with a non-secure use case. For example, the first channel may be associated with an ACPI 1202. The second channel may be associated with a secure use case. For example, the second channel may be associated with a TZ 1204. The SoC 120 may include an access policy manager 1206. The access policy manager 1206 may maintain, for the first channel, a channel descriptor (ACPI) 1208, a security attribute (ACPI) 1210, and an address range (ACPI) 1212. The access policy manager 1206 may maintain, for the second channel, a channel descriptor (TZ) 1214, a security attribute (TZ) 1216, and an address range (TZ) 1218. The SoC 120 may include a QSPI master serial engine 1220, which may communicate with a QSPI slave engine 1224 associated with a controller 110. The SoC 120 may communicate with the controller 110 via a QSPI with IBI 1222. The controller 110 may also be associated with the non-secure use case (first channel) and the secure use case (second channel). The non-secure use case may be associated with the ACPI 1202, and the secure use case may be associated with the TX 1204. In some cases, the controller 110 may include a separate access policy manager 1226. In other words, the SoC 120 may include an SoC access policy manager 1206 and the controller 110 may include a controller access policy manager 1226.

As indicated above, FIG. 12 is provided as an example. Other examples may differ from what is described with regard to FIG. 12.

Figure 13:
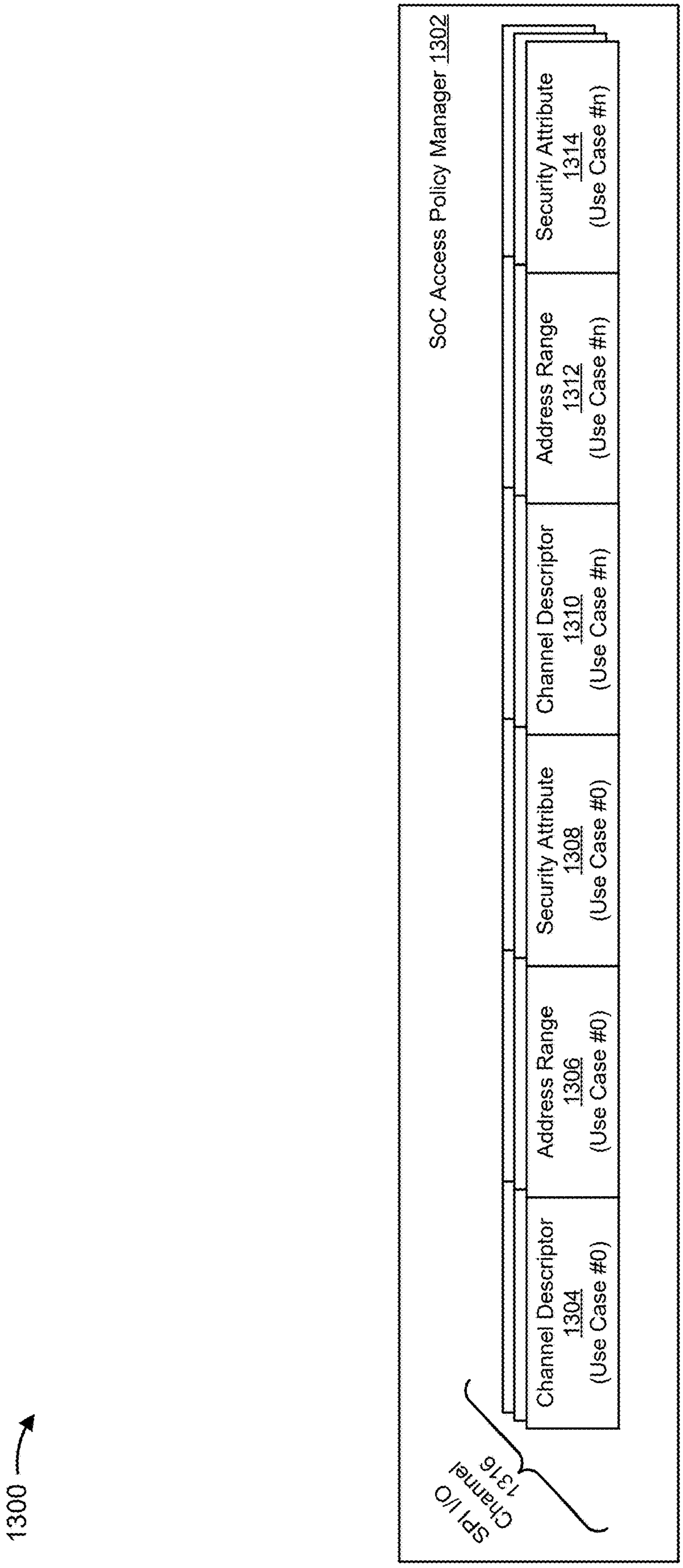
FIG. 13 is a diagram of an example associated with supporting secure and non-secure use cases over an SPI with IBIs, in accordance with the present disclosure.

FIG. 13 is a diagram of an example 1300 associated with supporting secure and non-secure use cases over an SPI with IBIs, in accordance with the present disclosure.

As shown in FIG. 13, an SoC access policy manager 1302 may maintain, for a first use case (Use Case #0) and across a number of SPI I/O channels 1316, a channel descriptor 1304, an address range 1306, and a security attribute 1308. The SoC access policy manager 1302 may maintain, for an Nth use case (Use Case #N) and across the number of SPI I/O channels 1316, a channel descriptor 1310, an address range 1312, and a security attribute 1314. The SoC access policy manager 1302 may be used to manage secure and non-secure transactions based at least in part on channel descriptors, security attributes, and/or addresses associated with different use cases.

As indicated above, FIG. 13 is provided as an example. Other examples may differ from what is described with regard to FIG. 13.

Figure 14:
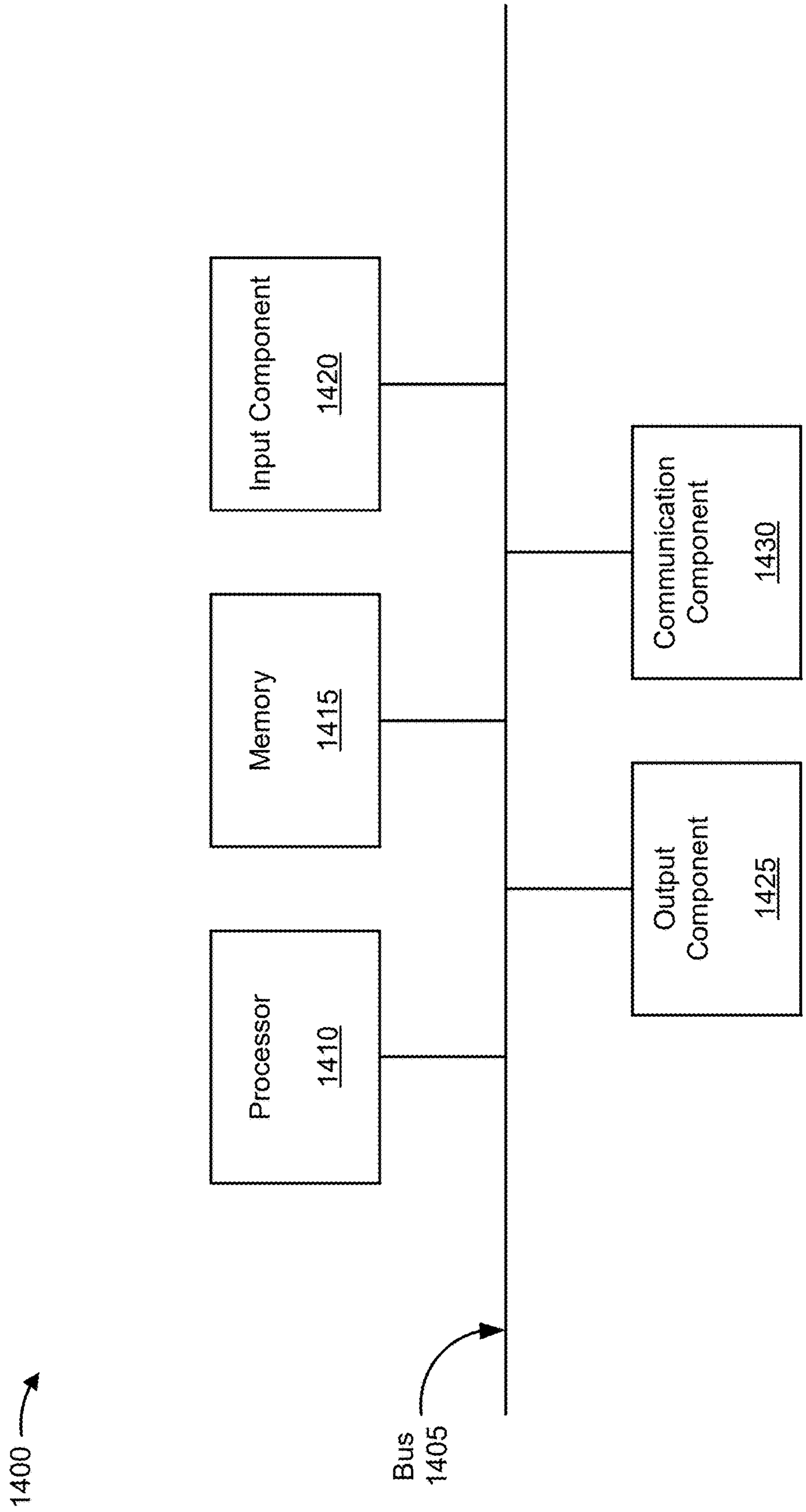
FIG. 14 is a diagram of example components of a device, in accordance with the present disclosure.

FIG. 14 is a diagram illustrating example components of a device 1400, in accordance with the present disclosure. The device 1400 may be associated with an SoC (e.g., SoC 120) or a controller (e.g., controller 110). As shown in FIG. 14, the device 1400 may include a bus 1405, a processor 1410, a memory 1415, an input component 1420, an output component 1425, and/or a communication component 1430.

The bus 1405 may include one or more components that enable wired and/or wireless communication among the components of the device 1400. The bus 1405 may couple together two or more components of FIG. 14, such as via operative coupling, communicative coupling, electronic coupling, and/or electric coupling. For example, the bus 1405 may include an electrical connection (e.g., a wire, a trace, and/or a lead) and/or a wireless bus. The processor 1410 may include a central processing unit, a graphics processing unit, a microprocessor, a controller, a microcontroller, a digital signal processor, a field-programmable gate array, an application-specific integrated circuit, and/or another type of processing component. The processor 1410 may be implemented in hardware, firmware, or a combination of hardware and software. In some aspects, the processor 1410 may include one or more processors capable of being programmed to perform one or more operations or processes described elsewhere herein.

The memory 1415 may include volatile and/or nonvolatile memory. For example, the memory 1415 may include random access memory (RAM), read only memory (ROM), a hard disk drive, and/or another type of memory (e.g., a flash memory, a magnetic memory, and/or an optical memory). The memory 1415 may include internal memory (e.g., RAM, ROM, or a hard disk drive) and/or removable memory (e.g., removable via a universal serial bus connection). The memory 1415 may be a non-transitory computer-readable medium. The memory 1415 may store information, one or more instructions, and/or software (e.g., one or more software applications) related to the operation of the device 1400. In some aspects, the memory 1415 may include one or more memories that are coupled (e.g., communicatively coupled) to one or more processors (e.g., processor 1410), such as via the bus 1405. Communicative coupling between a processor 1410 and a memory 1415 may enable the processor 1410 to read and/or process information stored in the memory 1415 and/or to store information in the memory 1415.

The input component 1420 may enable the device 1400 to receive input, such as user input and/or sensed input. For example, the input component 1420 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 1425 may enable the device 1400 to provide output, such as via a display, a speaker, and/or a light-emitting diode. The communication component 1430 may enable the device 1400 to communicate with other devices via a wired connection and/or a wireless connection. For example, the communication component 1430 may include a receiver, a transmitter, a transceiver, a modem, a network interface card, and/or an antenna.

The device 1400 may perform one or more operations or processes described herein. For example, a non-transitory computer-readable medium (e.g., memory 1415) may store a set of instructions (e.g., one or more instructions or code) for execution by the processor 1410. The processor 1410 may execute the set of instructions to perform one or more operations or processes described herein. In some aspects, execution of the set of instructions, by one or more processors 1410, causes the one or more processors 1410 and/or the device 1400 to perform one or more operations or processes described herein. In some aspects, hardwired circuitry may be used instead of or in combination with the instructions to perform one or more operations or processes described herein. Additionally, or alternatively, the processor 1410 may be configured to perform one or more operations or processes described herein. Thus, aspects described herein are not limited to any specific combination of hardware circuitry and software.

The number and arrangement of components shown in FIG. 14 are provided as an example. The device 1400 may include additional components, fewer components, different components, or differently arranged components than those shown in FIG. 14. Additionally, or alternatively, a set of components (e.g., one or more components) of the device 1400 may perform one or more functions described as being performed by another set of components of the device 1400.

Figure 15:
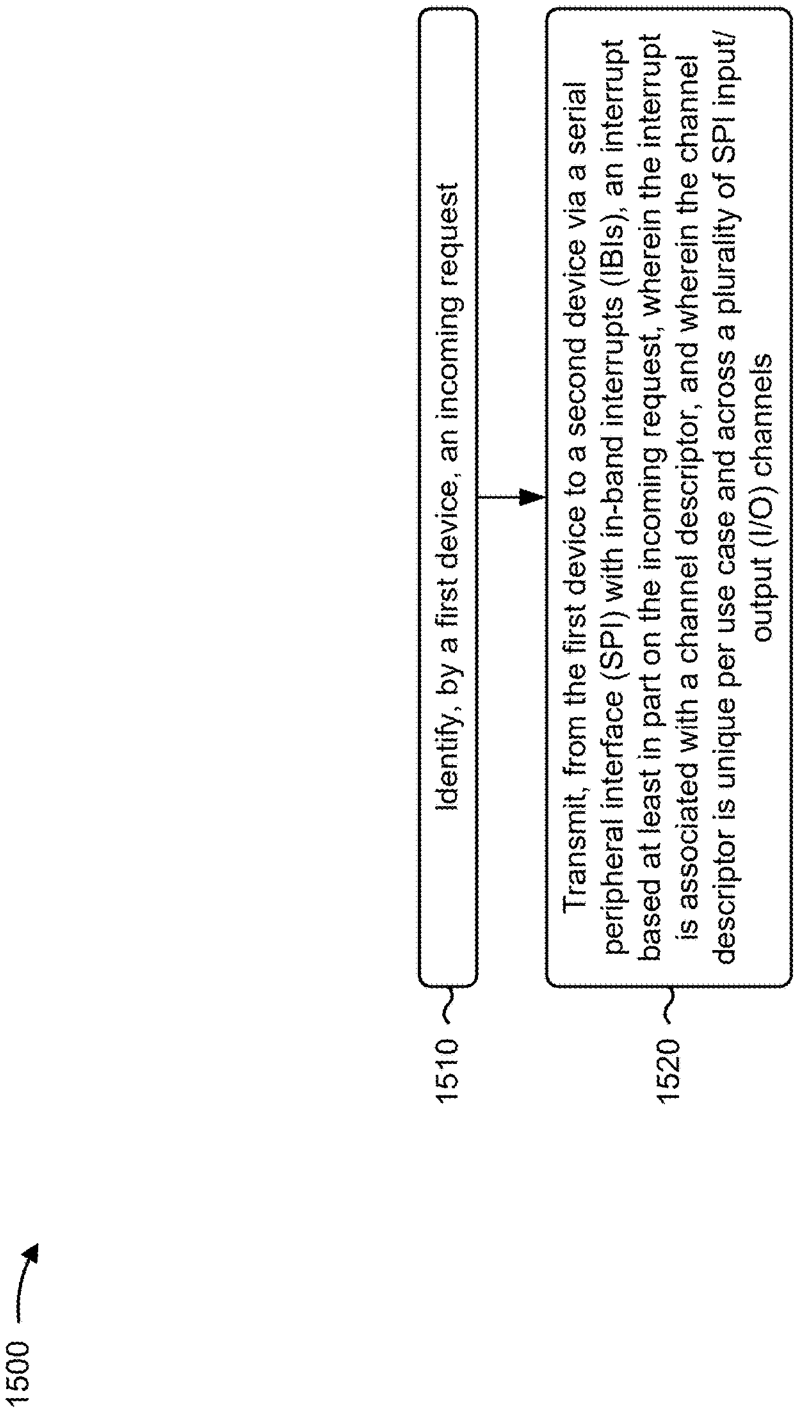
FIGS. 15-18 are flowcharts of example processes associated with SPIs with IBIs, in accordance with the present disclosure.

FIG. 15 is a flowchart of an example process 1500 associated with SPIs with IBIs. In some implementations, one or more process blocks of FIG. 15 are performed by a first device (e.g., SoC 120 or controller 110). Additionally, or alternatively, one or more process blocks of FIG. 15 may be performed by one or more components of device 1400, such as processor 1410, memory 1415, input component 1420, output component 1425, and/or communication component 1430.

As shown in FIG. 15, process 1500 may include identifying an incoming request (block 1510). For example, the first device may identify an incoming request, as described above.

As further shown in FIG. 15, process 1500 may include transmitting, to a second device via an SPI with IBIs, an interrupt based at least in part on the incoming request, wherein the interrupt is associated with a channel descriptor, and wherein the channel descriptor is unique per use case and across a plurality of SPI I/O channels (block 1520). For example, the first device may transmit, to a second device via an SPI with IBIs, an interrupt based at least in part on the incoming request, wherein the interrupt is associated with a channel descriptor, and wherein the channel descriptor is unique per use case and across a plurality of SPI I/O channels, as described above.

Process 1500 may include additional implementations, such as any single implementation or any combination of implementations described below and/or in connection with one or more other processes described elsewhere herein.

In a first implementation, the first device supports multiple use cases on a same SPI I/O channel based at least in part on different channel descriptors.

In a second implementation, alone or in combination with the first implementation, process 1500 includes maintaining a channel configuration register per SPI I/O channel, wherein the channel configuration register indicates, for each use case, the channel descriptor and a requested priority, wherein the channel descriptor is unique per each use case across the plurality of SPI I/O channels, and the requested priority is configurable per use case.

In a third implementation, alone or in combination with one or more of the first and second implementations, process 1500 includes checking a channel configuration register based at least in part on the incoming request; determining that multiple use cases are supported on an SPI I/O channel, of the plurality of SPI I/O channels; checking a status of a transmit buffer by reading a channel status register; and updating the channel descriptor to indicate that an outgoing buffer is associated with a certain use case of the multiple use cases In a fourth implementation, alone or in combination with one or more of the first through third implementations, the SPI with IBIs is a QSPI with IBIs.

In a fifth implementation, alone or in combination with one or more of the first through fourth implementations, the incoming request is associated with a write operation.

In a sixth implementation, alone or in combination with one or more of the first through fifth implementations, the first device is an SOC and the second device is a controller.

Although FIG. 15 shows example blocks of process 1500, in some implementations, process 1500 includes additional blocks, fewer blocks, different blocks, or differently arranged blocks than those depicted in FIG. 15. Additionally, or alternatively, two or more of the blocks of process 1500 may be performed in parallel.

Figure 16:
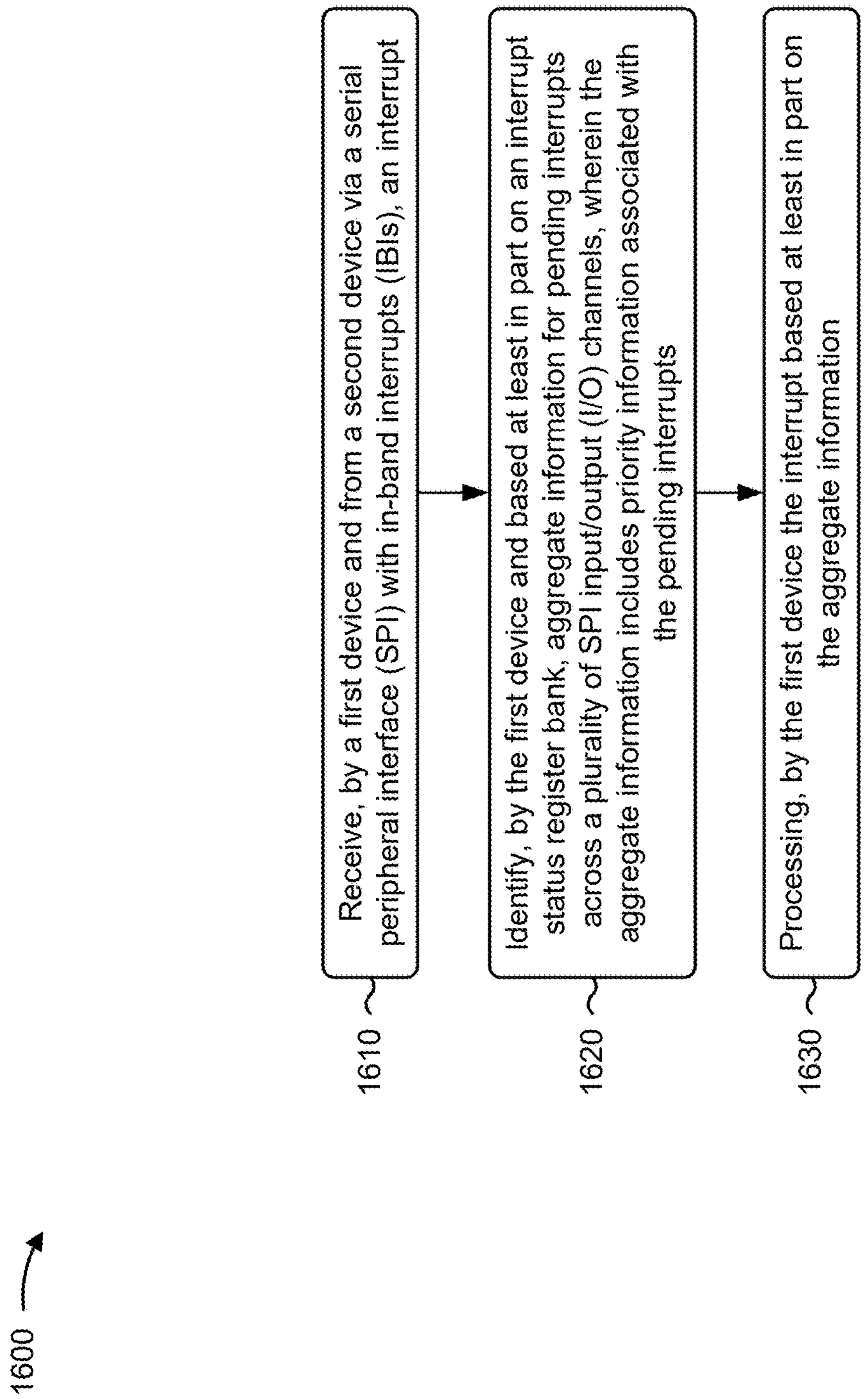

FIG. 16 is a flowchart of an example process 1600 associated with SPIs with IBIs. In some implementations, one or more process blocks of FIG. 16 are performed by a first device (e.g., SoC 120 or controller 110). Additionally, or alternatively, one or more process blocks of FIG. 16 may be performed by one or more components of device 1400, such as processor 1410, memory 1416, input component 1420, output component 1425, and/or communication component 1430.

As shown in FIG. 16, process 1600 may include receiving, from a second device via an SPI with IBIs, an interrupt (block 1610). For example, the first device may receive, from a second device via an SPI with IBIs, an interrupt, as described above.

As further shown in FIG. 16, process 1600 may include identifying, based at least in part on an interrupt status register bank, aggregate information for pending interrupts across a plurality of SPI I/O channels, wherein the aggregate information includes priority information associated with the pending interrupts (block 1620). For example, the first device may identify, based at least in part on an interrupt status register bank, aggregate information for pending interrupts across a plurality of SPI I/O channels, wherein the aggregate information includes priority information associated with the pending interrupts, as described above.

As further shown in FIG. 16, process 1600 may include processing the interrupt based at least in part on the aggregate information (block 1630). For example, the first device may process the interrupt based at least in part on the aggregate information, as described above.

Process 1600 may include additional implementations, such as any single implementation or any combination of implementations described below and/or in connection with one or more other processes described elsewhere herein.

In a first implementation, the first device supports interrupts for multiple use cases associated with a same SPI I/O channel, of the plurality of SPI I/O channels, based at least in part on interrupt priority.

In a second implementation, alone or in combination with the first implementation, process 1600 includes maintaining the interrupt status register bank, wherein the interrupt status register bank indicates, for each use case of a plurality of use cases, a channel descriptor and an interrupt priority, wherein the channel descriptor is unique per each use case across the plurality of SPI I/O channels, and the interrupt status register bank indicates the aggregate information across the plurality of SPI I/O channels and the plurality of use cases.

In a third implementation, alone or in combination with one or more of the first and second implementations, process 1600 includes discovering one or more use cases supported with each SPI I/O channel, of the plurality of SPI I/O channels, using one or more channel status registers associated with the interrupt status register bank.

In a fourth implementation, alone or in combination with one or more of the first through third implementations, process 1600 includes processing the interrupt based at least in part on the interrupt having a highest priority among a plurality of the pending interrupts, as indicated by the aggregate information.

In a fifth implementation, alone or in combination with one or more of the first through fourth implementations, the first device is an SOC and the second device is a controller.

Although FIG. 16 shows example blocks of process 1600, in some implementations, process 1600 includes additional blocks, fewer blocks, different blocks, or differently arranged blocks than those depicted in FIG. 16. Additionally, or alternatively, two or more of the blocks of process 1600 may be performed in parallel.

Figure 17:
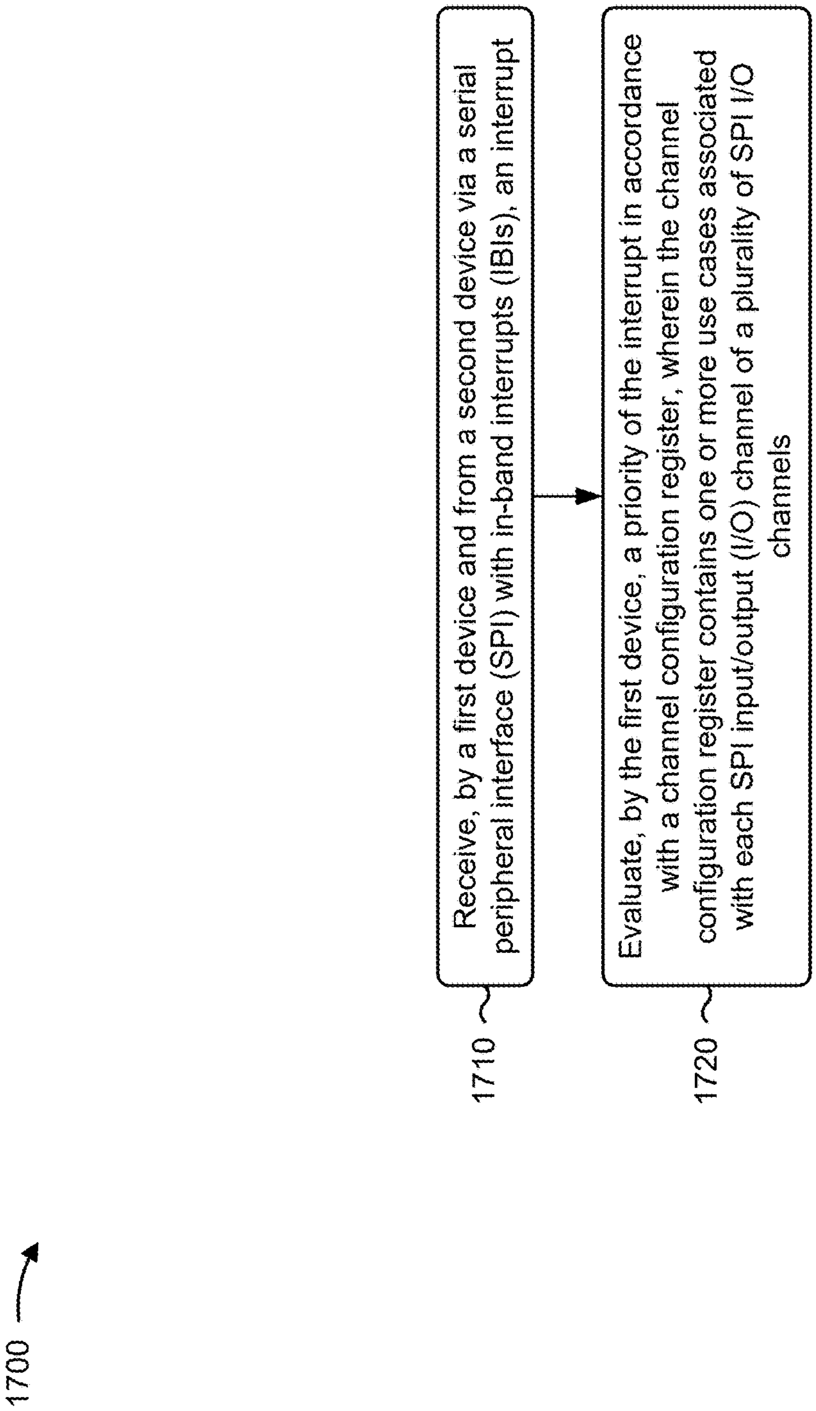

FIG. 17 is a flowchart of an example process 1700 associated with SPIs with IBIs. In some implementations, one or more process blocks of FIG. 17 are performed by a first device (e.g., SoC 120 or controller 110). Additionally, or alternatively, one or more process blocks of FIG. 17 may be performed by one or more components of device 1400, such as processor 1410, memory 1417, input component 1420, output component 1425, and/or communication component 1430.

As shown in FIG. 17, process 1700 may include receiving, from a second device via an SPI with IBIs, an interrupt (block 1710). For example, the first device may receive, from a second device via an SPI with IBIs, an interrupt, as described above.

As further shown in FIG. 17, process 1700 may include evaluating a priority of the interrupt in accordance with a channel configuration register, wherein the channel configuration register contains one or more use cases associated with each SPI I/O channel of a plurality of SPI I/O channels (block 1720). For example, the first device may evaluate a priority of the interrupt in accordance with a channel configuration register, wherein the channel configuration register contains one or more use cases associated with each SPI I/O channel of a plurality of SPI I/O channels, as described above.

Process 1700 may include additional implementations, such as any single implementation or any combination of implementations described below and/or in connection with one or more other processes described elsewhere herein.

In a first implementation, interrupt priority is configured across the plurality of SPI I/O channels, and the priority of the interrupt is evaluated in accordance with the interrupt priority during a processing of the interrupt.

In a second implementation, alone or in combination with the first implementation, process 1700 includes reading the channel configuration register, wherein the channel configuration register is published by the first device; determining an interrupt priority per use case based at least in part on the channel configuration register; and updating an interrupt priority configuration register bank across the one or more use cases supported on the plurality of SPI I/O channels.

In a third implementation, alone or in combination with one or more of the first and second implementations, process 1700 includes maintaining the channel configuration register per SPI I/O channel, wherein the channel configuration register indicates, for each use case, a channel descriptor and a requested priority, wherein the channel descriptor is unique per each use case across the plurality of SPI I/O channels, and the requested priority is configurable per use case.

In a fourth implementation, alone or in combination with one or more of the first through third implementations, process 1700 includes maintaining an interrupt priority configuration register bank, wherein the interrupt priority configuration register bank indicates, for each use case, a channel descriptor and an interrupt priority, and the channel descriptor is unique per each use case across the plurality of SPI I/O channels.

In a fifth implementation, alone or in combination with one or more of the first through fourth implementations, the first device is an SOC and the second device is a controller.

Although FIG. 17 shows example blocks of process 1700, in some implementations, process 1700 includes additional blocks, fewer blocks, different blocks, or differently arranged blocks than those depicted in FIG. 17. Additionally, or alternatively, two or more of the blocks of process 1700 may be performed in parallel.

Figure 18:
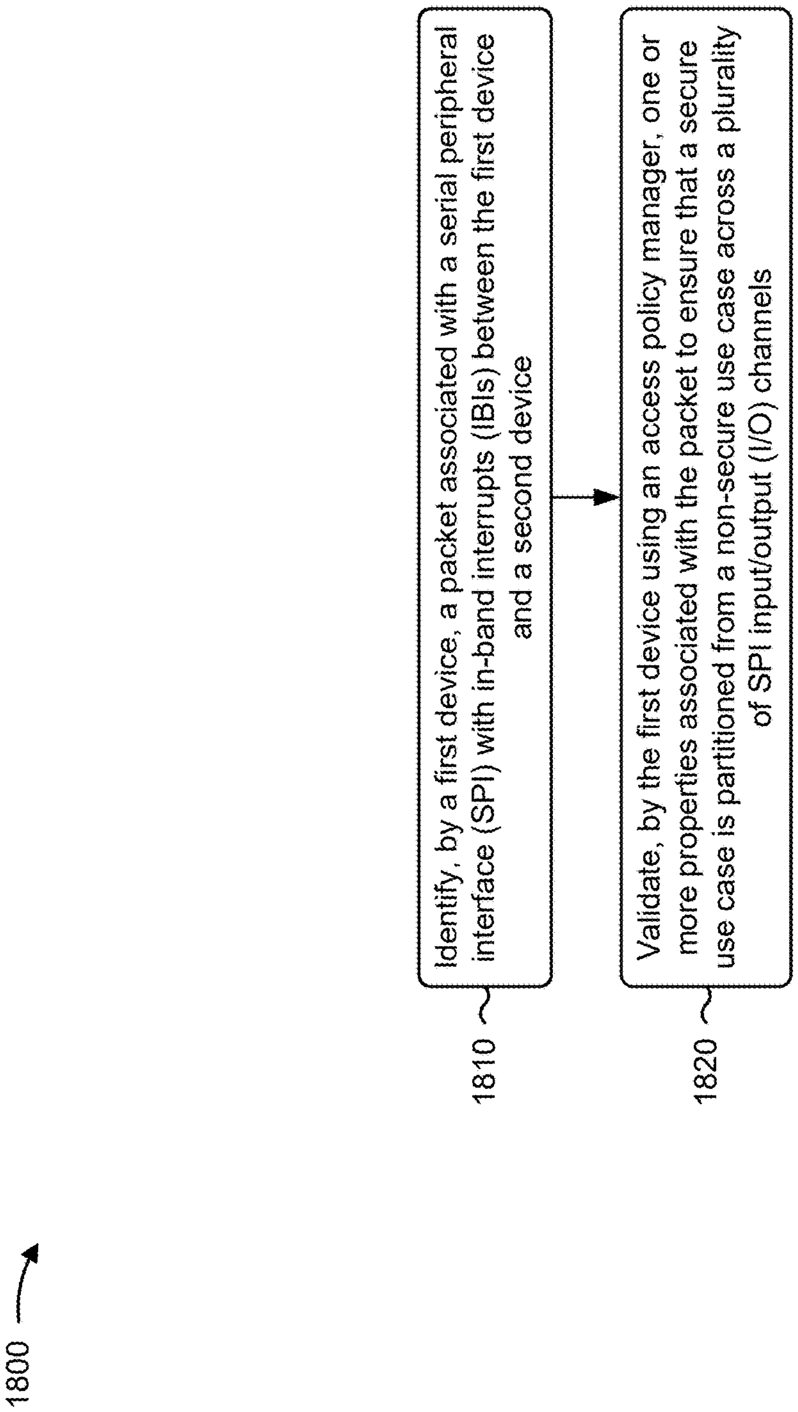

FIG. 18 is a flowchart of an example process 1800 associated with SPIs with IBIs. In some implementations, one or more process blocks of FIG. 18 are performed by a first device (e.g., SoC 120 or controller 110). Additionally, or alternatively, one or more process blocks of FIG. 18 may be performed by one or more components of device 1400, such as processor 1410, memory 1418, input component 1420, output component 1425, and/or communication component 1430.

As shown in FIG. 18, process 1800 may include identifying a packet associated with an SPI with IBIs between the first device and a second device (block 1810). For example, the first device may identify a packet associated with an SPI with IBIs between the first device and a second device, as described above.

As further shown in FIG. 18, process 1800 may include validating, using an access policy manager, one or more properties associated with the packet to ensure that a secure use case is partitioned from a non-secure use case across a plurality of SPI I/O channels (block 1820). For example, the first device may validate, using an access policy manager, one or more properties associated with the packet to ensure that a secure use case is partitioned from a non-secure use case across a plurality of SPI I/O channels, as described above.

Process 1800 may include additional implementations, such as any single implementation or any combination of implementations described below and/or in connection with one or more other processes described elsewhere herein.

In a first implementation, the first device is configured to support secure use cases and non-secure use cases over the SPI with IBIs.

In a second implementation, alone or in combination with the first implementation, the packet is a Tx packet or an Rx packet.

In a third implementation, alone or in combination with one or more of the first and second implementations, the one or more properties include one or more of a channel descriptor, a security attribute, or an address, wherein the channel descriptor uniquely identifies a type of use case across an SPI I/O channel of the plurality of SPI I/O channels, wherein the security attribute indicates a secure attribute or a non-secure attribute, and the address is included in a range of addresses that are allowed to be accessed by a certain use case in either a Tx direction or an Rx direction.

In a fourth implementation, alone or in combination with one or more of the first through third implementations, the secure use case is associated with a first SPI I/O channel of the plurality of SPI I/O channels, and the non-secure use case is associated with a second SPI I/O channel of the plurality of SPI I/O channels.

In a fifth implementation, alone or in combination with one or more of the first through fourth implementations, process 1800 includes maintaining, via the access policy manager, the one or more properties for each use case of a plurality of use cases and across the plurality of SPI I/O channels.

In a sixth implementation, alone or in combination with one or more of the first through fifth implementations, the first device is an SOC and the second device is a controller.

Although FIG. 18 shows example blocks of process 1800, in some implementations, process 1800 includes additional blocks, fewer blocks, different blocks, or differently arranged blocks than those depicted in FIG. 18. Additionally, or alternatively, two or more of the blocks of process 1800 may be performed in parallel.

The following provides an overview of some Aspects of the present disclosure:

Aspect 1: A first device, comprising: one or more components configured to: identify an incoming request; and transmit, to a second device via a serial peripheral interface (SPI) with in-band interrupts (IBIs), an interrupt based at least in part on the incoming request, wherein the interrupt is associated with a channel descriptor, and wherein the channel descriptor is unique per use case and across a plurality of SPI input/output (I/O) channels.

Aspect 2: The first device of Aspect 1, wherein the first device supports multiple use cases on a same SPI I/O channel based at least in part on different channel descriptors.

Aspect 3: The first device of any of Aspects 1-2, wherein the one or more components are further configured to: maintain a channel configuration register per SPI I/O channel, wherein the channel configuration register indicates, for each use case, the channel descriptor and a requested priority, wherein the channel descriptor is unique per each use case across the plurality of SPI I/O channels, and wherein the requested priority is configurable per use case.

Aspect 4: The first device of any of Aspects 1-3, wherein the one or more components are further configured to: check a channel configuration register based at least in part on the incoming request; determine that multiple use cases are supported on an SPI I/O channel, of the plurality of SPI I/O channels; check a status of a transmit buffer by reading a channel status register; and update the channel descriptor to indicate that an outgoing buffer is associated with a certain use case of the multiple use cases.

Aspect 5: The first device of any of Aspects 1-4, wherein the SPI with IBIs is a quad SPI (QSPI) with IBIs.

Aspect 6: The first device of any of Aspects 1-5, wherein the incoming request is associated with a write operation.

Aspect 7: The first device of any of Aspects 1-6, wherein the first device is a system-on-chip (SOC) and the second device is a controller.

Aspect 8: A first device, comprising: one or more components configured to: receive, from a second device via a serial peripheral interface (SPI) with in-band interrupts (IBIs), an interrupt; identify, based at least in part on an interrupt status register bank, aggregate information for pending interrupts across a plurality of SPI input/output (I/O) channels, wherein the aggregate information includes priority information associated with the pending interrupts; and process the interrupt based at least in part on the aggregate information.

Aspect 9: The first device of Aspect 8, wherein the first device supports interrupts for multiple use cases associated with a same SPI I/O channel, of the plurality of SPI I/O channels, based at least in part on interrupt priority.

Aspect 10: The first device of any of Aspects 8-9, wherein the one or more components are further configured to: maintain the interrupt status register bank, wherein the interrupt status register bank indicates, for each use case of a plurality of use cases, a channel descriptor and an interrupt priority, wherein the channel descriptor is unique per each use case across the plurality of SPI I/O channels, and the interrupt status register bank indicates the aggregate information across the plurality of SPI I/O channels and the plurality of use cases.

Aspect 11: The first device of any of Aspects 8-10, wherein the one or more components are further configured to: discover one or more use cases supported with each SPI I/O channel, of the plurality of SPI I/O channels, using one or more channel status registers associated with the interrupt status register bank.

Aspect 12: The first device of any of Aspects 8-11, wherein the one or more components are further configured to: process the interrupt based at least in part on the interrupt having a highest priority among a plurality of the pending interrupts, as indicated by the aggregate information.

Aspect 13: The first device of any of Aspects 8-12, wherein the first device is a system-on-chip (SOC) and the second device is a controller.

Aspect 14: A first device, comprising: one or more components configured to: receive, from a second device via a serial peripheral interface (SPI) with in-band interrupts (IBIs), an interrupt; and evaluate a priority of the interrupt in accordance with a channel configuration register, wherein the channel configuration register contains one or more use cases associated with each SPI input/output (I/O) channel of a plurality of SPI I/O channels.

Aspect 15: The first device of Aspect 14, wherein interrupt priority is configured across the plurality of SPI I/O channels, and wherein the priority of the interrupt is evaluated in accordance with the interrupt priority during a processing of the interrupt.

Aspect 16: The first device of any of Aspects 14-15, wherein the one or more components are further configured to: read the channel configuration register, wherein the channel configuration register is published by the first device; determine an interrupt priority per use case based at least in part on the channel configuration register; and update an interrupt priority configuration register bank across the one or more use cases supported on the plurality of SPI I/O channels.

Aspect 17: The first device of any of Aspects 14-16, wherein the one or more components are further configured to: maintain the channel configuration register per SPI I/O channel, wherein the channel configuration register indicates, for each use case, a channel descriptor and a requested priority, wherein the channel descriptor is unique per each use case across the plurality of SPI I/O channels, and wherein the requested priority is configurable per use case.

Aspect 18: The first device of any of Aspects 14-17, wherein the one or more components are further configured to: maintain an interrupt priority configuration register bank, wherein the interrupt priority configuration register bank indicates, for each use case, a channel descriptor and an interrupt priority, and wherein the channel descriptor is unique per each use case across the plurality of SPI I/O channels.

Aspect 19: The first device of any of Aspects 14-18, wherein the first device is a system-on-chip (SOC) and the second device is a controller.

Aspect 20: A first device, comprising: one or more components configured to: identify a packet associated with a serial peripheral interface (SPI) with in-band interrupts (IBIs) between the first device and a second device; and validate, using an access policy manager, one or more properties associated with the packet to ensure that a secure use case is partitioned from a non-secure use case across a plurality of SPI input/output (I/O) channels.

Aspect 21: The first device of Aspect 20, wherein the first device is configured to support secure use cases and non-secure use cases over the SPI with IBIs.

Aspect 22: The first device of any of Aspects 20-21, wherein the packet is a transmit (Tx) packet or a receive (Rx) packet.

Aspect 23: The first device of any of Aspects 20-22, wherein the one or more properties include one or more of a channel descriptor, a security attribute, or an address, wherein the channel descriptor uniquely identifies a type of use case across an SPI I/O channel of the plurality of SPI I/O channels, wherein the security attribute indicates a secure attribute or a non-secure attribute, and wherein the address is included in a range of addresses that are allowed to be accessed by a certain use case in either a transmit (Tx) direction or a receive (Rx) direction.

Aspect 24: The first device of any of Aspects 20-23, wherein the secure use case is associated with a first SPI I/O channel of the plurality of SPI I/O channels, and wherein the non-secure use case is associated with a second SPI I/O channel of the plurality of SPI I/O channels.

Aspect 25: The first device of any of Aspects 20-24, wherein the one or more components are further configured to: maintain, via the access policy manager, the one or more properties for each use case of a plurality of use cases and across the plurality of SPI I/O channels.

Aspect 26: The first device of any of Aspects 20-25, wherein the first device is a system-on-chip (SOC) and the second device is a controller.

Aspect 27: A method, comprising: identifying, by a first device, an incoming request; and transmitting, from the first device to a second device via a serial peripheral interface (SPI) with in-band interrupts (IBIs), an interrupt based at least in part on the incoming request, wherein the interrupt is associated with a channel descriptor, and wherein the channel descriptor is unique per use case and across a plurality of SPI input/output (I/O) channels.

Aspect 28: The method of Aspect 27, wherein the first device supports multiple use cases on a same SPI I/O channel based at least in part on different channel descriptors.

Aspect 29: The method of any of Aspects 27-28, further comprising: maintaining a channel configuration register per SPI I/O channel, wherein the channel configuration register indicates, for each use case, the channel descriptor and a requested priority, wherein the channel descriptor is unique per each use case across the plurality of SPI I/O channels, and wherein the requested priority is configurable per use case.

Aspect 30: The method of any of Aspects 27-29, further comprising: checking a channel configuration register based at least in part on the incoming request; determining that multiple use cases are supported on an SPI I/O channel, of the plurality of SPI I/O channels; checking a status of a transmit buffer by reading a channel status register; and updating the channel descriptor to indicate that an outgoing buffer is associated with a certain use case of the multiple use cases.

Aspect 31: The method of any of Aspects 27-30, wherein the SPI with IBIs is a quad SPI (QSPI) with IBIs.

Aspect 32: The method of any of Aspects 27-31, wherein the incoming request is associated with a write operation.

Aspect 33: The method of any of Aspects 27-32, wherein the first device is a system-on-chip (SOC) and the second device is a controller.

Aspect 34: A method, comprising: receiving, by a first device and from a second device via a serial peripheral interface (SPI) with in-band interrupts (IBIs), an interrupt; identifying, by the first device and based at least in part on an interrupt status register bank, aggregate information for pending interrupts across a plurality of SPI input/output (I/O) channels, wherein the aggregate information includes priority information associated with the pending interrupts; and processing, by the first device, the interrupt based at least in part on the aggregate information.

Aspect 35: The method of Aspect 34, wherein the first device supports interrupts for multiple use cases associated with a same SPI I/O channel, of the plurality of SPI I/O channels, based at least in part on interrupt priority.

Aspect 36: The method of any of Aspects 34-35, further comprising: maintaining the interrupt status register bank, wherein the interrupt status register bank indicates, for each use case of a plurality of use cases, a channel descriptor and an interrupt priority, wherein the channel descriptor is unique per each use case across the plurality of SPI I/O channels, and the interrupt status register bank indicates the aggregate information across the plurality of SPI I/O channels and the plurality of use cases.

Aspect 37: The method of any of Aspects 34-36, further comprising: discovering one or more use cases supported with each SPI I/O channel, of the plurality of SPI I/O channels, using one or more channel status registers associated with the interrupt status register bank.

Aspect 38: The method of any of Aspects 34-37, further comprising: processing the interrupt based at least in part on the interrupt having a highest priority among a plurality of the pending interrupts, as indicated by the aggregate information.

Aspect 39: The method of any of Aspects 34-38, wherein the first device is a system-on-chip (SOC) and the second device is a controller.

Aspect 40: A method, comprising: receiving, by a first device and from a second device via a serial peripheral interface (SPI) with in-band interrupts (IBIs), an interrupt; and evaluating, by the first device, a priority of the interrupt in accordance with a channel configuration register, wherein the channel configuration register contains one or more use cases associated with each SPI input/output (I/O) channel of a plurality of SPI I/O channels.

Aspect 41: The method of Aspect 40, wherein interrupt priority is configured across the plurality of SPI I/O channels, and wherein the priority of the interrupt is evaluated in accordance with the interrupt priority during a processing of the interrupt.

Aspect 42: The method of any of Aspects 40-41, further comprising: reading the channel configuration register, wherein the channel configuration register is published by the first device; determining an interrupt priority per use case based at least in part on the channel configuration register; and updating an interrupt priority configuration register bank across the one or more use cases supported on the plurality of SPI I/O channels.

Aspect 43: The method of any of Aspects 40-42, further comprising: maintaining the channel configuration register per SPI I/O channel, wherein the channel configuration register indicates, for each use case, a channel descriptor and a requested priority, wherein the channel descriptor is unique per each use case across the plurality of SPI I/O channels, and wherein the requested priority is configurable per use case.

Aspect 44: The method of any of Aspects 40-43, further comprising: maintaining an interrupt priority configuration register bank, wherein the interrupt priority configuration register bank indicates, for each use case, a channel descriptor and an interrupt priority, and wherein the channel descriptor is unique per each use case across the plurality of SPI I/O channels.

Aspect 45: The method of any of Aspects 40-44, wherein the first device is a system-on-chip (SOC) and the second device is a controller.

Aspect 46: A method, comprising: identifying, by a first device, a packet associated with a serial peripheral interface (SPI) with in-band interrupts (IBIs) between the first device and a second device; and validating, by the first device using an access policy manager, one or more properties associated with the packet to ensure that a secure use case is partitioned from a non-secure use case across a plurality of SPI input/output (I/O) channels.

Aspect 47: The method of Aspect 46, wherein the first device is configured to support secure use cases and non-secure use cases over the SPI with IBIs.

Aspect 48: The method of any of Aspects 46-47, wherein the packet is a transmit (Tx) packet or a receive (Rx) packet.

Aspect 49: The method of any of Aspects 46-48, wherein the one or more properties include one or more of a channel descriptor, a security attribute, or an address, wherein the channel descriptor uniquely identifies a type of use case across an SPI I/O channel of the plurality of SPI I/O channels, wherein the security attribute indicates a secure attribute or a non-secure attribute, and wherein the address is included in a range of addresses that are allowed to be accessed by a certain use case in either a transmit (Tx) direction or a receive (Rx) direction.

Aspect 50: The method of any of Aspects 46-49, wherein the secure use case is associated with a first SPI I/O channel of the plurality of SPI I/O channels, and wherein the non-secure use case is associated with a second SPI I/O channel of the plurality of SPI I/O channels.

Aspect 51: The method of any of Aspects 46-50, further comprising: maintaining, via the access policy manager, the one or more properties for each use case of a plurality of use cases and across the plurality of SPI I/O channels.

Aspect 52: The method of any of Aspects 46-51, wherein the first device is a system-on-chip (SOC) and the second device is a controller.

Aspect 53: A system configured to perform one or more operations recited in one or more of Aspects 1-52.

Aspect 54: An apparatus comprising means for performing one or more operations recited in one or more of Aspects 1-52.

Aspect 55: A non-transitory computer-readable medium storing a set of instructions, the set of instructions comprising one or more instructions that, when executed by a device, cause the device to perform one or more operations recited in one or more of Aspects 1-52.

Aspect 56: A computer program product comprising instructions or code for executing one or more operations recited in one or more of Aspects 1-52.

The foregoing disclosure provides illustration and description but is not intended to be exhaustive or to limit the aspects to the precise forms disclosed.

Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first device, comprising:
one or more components configured to:
identify an incoming request; and
transmit, to a second device via a serial peripheral interface (SPI) with in-band interrupts (IBIs), an interrupt based at least in part on the incoming request, wherein the interrupt is associated with a channel descriptor, wherein the channel descriptor is unique per use case and across a plurality of SPI input/output (I/O) channels, and wherein the first device supports multiple use cases on a same SPI I/O channel.

2. The first device of claim 1, wherein the first device supports the multiple use cases on the same SPI I/O channel based at least in part on different channel descriptors.

3. The first device of claim 1, wherein the one or more components are further configured to:
maintain a channel configuration register per SPI I/O channel, wherein the channel configuration register indicates, for each use case, the channel descriptor and a requested priority, wherein the channel descriptor is unique per each use case across the plurality of SPI I/O channels, and wherein the requested priority is configurable per use case.

4. The first device of claim 1, wherein the one or more components are further configured to:
check a channel configuration register based at least in part on the incoming request;
determine that the multiple use cases are supported on an SPI I/O channel, of the plurality of SPI I/O channels, wherein the SPI I/O channel comprises the same SPI I/O channel;
check a status of a transmit buffer by reading a channel status register; and
update the channel descriptor to indicate that an outgoing buffer is associated with a certain use case of the multiple use cases.

5. The first device of claim 1, wherein the SPI with IBIs is a quad SPI (QSPI) with IBIS.

6. The first device of claim 1, wherein the incoming request is associated with a write operation.

7. The first device of claim 1, wherein the first device is a system-on-chip (SOC) and the second device is a controller.

8. A first device, comprising:
one or more components configured to:
receive, from a second device via a serial peripheral interface (SPI) with in-band interrupts (IBIs), an interrupt;
identify, based at least in part on an interrupt status register bank, aggregate information for pending interrupts across a plurality of SPI input/output (I/O) channels, wherein the aggregate information includes priority information associated with the pending interrupts; and
process the interrupt based at least in part on the aggregate information.

9. The first device of claim 8, wherein the first device supports interrupts for multiple use cases associated with a same SPI I/O channel, of the plurality of SPI I/O channels, based at least in part on interrupt priority.

10. The first device of claim 8, wherein the one or more components are further configured to:
maintain the interrupt status register bank, wherein the interrupt status register bank indicates, for each use case of a plurality of use cases, a channel descriptor and an interrupt priority, wherein the channel descriptor is unique per each use case across the plurality of SPI I/O channels, and the interrupt status register bank indicates the aggregate information across the plurality of SPI I/O channels and the plurality of use cases.

11. The first device of claim 8, wherein the one or more components are further configured to:
discover one or more use cases supported with each SPI I/O channel, of the plurality of SPI I/O channels, using one or more channel status registers associated with the interrupt status register bank.

12. The first device of claim 8, wherein the one or more components are further configured to:
process the interrupt based at least in part on the interrupt having a highest priority among a plurality of the pending interrupts, as indicated by the aggregate information.

13. The first device of claim 8, wherein the first device is a system-on-chip (SOC) and the second device is a controller.

14. A first device, comprising:
one or more components configured to:
receive, from a second device via a serial peripheral interface (SPI) with in-band interrupts (IBIs), an interrupt; and
evaluate a priority of the interrupt in accordance with a channel configuration register, wherein the channel configuration register contains one or more use cases associated with each SPI input/output (I/O) channel of a plurality of SPI I/O channels.

15. The first device of claim 14, wherein interrupt priority is configured across the plurality of SPI I/O channels, and wherein the priority of the interrupt is evaluated in accordance with the interrupt priority during a processing of the interrupt.

16. The first device of claim 14, wherein the one or more components are further configured to:
read the channel configuration register, wherein the channel configuration register is published by the first device;

determine an interrupt priority per use case based at least in part on the channel configuration register; and update an interrupt priority configuration register bank across the one or more use cases supported on the plurality of SPI I/O channels.

17. The first device of claim 14, wherein the one or more components are further configured to:

maintain the channel configuration register per SPI I/O channel, wherein the channel configuration register indicates, for each use case, a channel descriptor and a requested priority, wherein the channel descriptor is unique per each use case across the plurality of SPI I/O channels, and wherein the requested priority is configurable per use case.

18. The first device of claim 14, wherein the one or more components are further configured to:

maintain an interrupt priority configuration register bank, wherein the interrupt priority configuration register bank indicates, for each use case, a channel descriptor and an interrupt priority, and wherein the channel descriptor is unique per each use case across the plurality of SPI I/O channels.

19. The first device of claim 14, wherein the first device is a system-on-chip (SOC) and the second device is a controller.

20. A first device, comprising:

one or more components configured to:

identify a packet associated with a serial peripheral interface (SPI) with in-band interrupts (IBIs) between the first device and a second device; and validate, using an access policy manager, one or more properties associated with the packet to ensure that a secure use case is partitioned from a non-secure use case across a plurality of SPI input/output (I/O) channels.

21. The first device of claim 20, wherein the first device is configured to support secure use cases and non-secure use cases over the SPI with IBIs.

22. The first device of claim 20, wherein the packet is a transmit (Tx) packet.

23. The first device of claim 20, wherein the packet is a receive (Rx) packet.

24. The first device of claim 20, wherein the one or more properties include one or more of a channel descriptor, a security attribute, or an address, wherein the channel descriptor uniquely identifies a type of use case across an SPI I/O channel of the plurality of SPI I/O channels, wherein the security attribute indicates a secure attribute or a non-secure attribute, and wherein the address is included in a range of addresses that are allowed to be accessed by a certain use case in either a transmit (Tx) direction or a receive (Rx) direction.

25. The first device of claim 20, wherein the secure use case is associated with a first SPI I/O channel of the plurality of SPI I/O channels, and wherein the non-secure use case is associated with a second SPI I/O channel of the plurality of SPI I/O channels.

26. The first device of claim 20, wherein the one or more components are further configured to:

maintain, via the access policy manager, the one or more properties for each use case of a plurality of use cases and across the plurality of SPI I/O channels.

27. The first device of claim 20, wherein the first device is a system-on-chip (SOC) and the second device is a controller.

* * * * *